US012608442B2

(12) United States Patent
Zhang

(10) Patent No.: US 12,608,442 B2
(45) Date of Patent: Apr. 21, 2026

(54) MACHINE LEARNING MODEL SELECTION BASED ON FEATURE MERGING FOR A SPATIAL LOCATION ACROSS MULTIPLE TIME WINDOWS

(71) Applicant: Landmark Graphics Corporation, Houston, TX (US)

(72) Inventor: Jiazuo Zhang, London (GB)

( * ) Notice: Subject to any disclaimer, the term of this patent is extended or adjusted under 35 U.S.C. 154(b) by 994 days.

(21) Appl. No.: 17/446,537

(22) Filed: Aug. 31, 2021

(65) Prior Publication Data

US 2023/0068373 A1    Mar. 2, 2023

(51) Int. Cl.
G06F 18/211    (2023.01)
G06F 18/20    (2023.01)
G06F 18/22    (2023.01)
G06F 18/25    (2023.01)
G06N 20/00    (2019.01)
G06V 10/75    (2022.01)

(52) U.S. Cl.
CPC ............ *G06F 18/211* (2023.01); *G06F 18/22* (2023.01); *G06F 18/25* (2023.01); *G06F 18/285* (2023.01); *G06N 20/00* (2019.01); *G06V 10/751* (2022.01)

(58) Field of Classification Search
CPC .. E21B 2200/02; E21B 2200/20; E21B 49/00; E21B 47/00; G06F 18/211; G06F 18/22; G06F 18/25; G06F 18/285; G06N 20/00; G06V 10/751
See application file for complete search history.

(56) References Cited

U.S. PATENT DOCUMENTS 7,117,188 B2    10/2006    Guyon et al.
8,311,967 B1    11/2012    Lin et al.
(Continued)

FOREIGN PATENT DOCUMENTS

CN    109919184 A    6/2019
GB    2598186    10/2022
(Continued)

OTHER PUBLICATIONS

"U.S. Appl. No. 16/932,056, Final Office Action", Mar. 8, 2023, 16 pages.
(Continued)

*Primary Examiner* — Andrew T Chiusano
(74) *Attorney, Agent, or Firm* — DeLizio, Peacock, Lewin and Guerra, LLP

(57)    ABSTRACT

A method comprises receiving a current dataset for a current time window from at least one sensor in a wellbore created in a subsurface formation, wherein the current dataset comprises values of a number of current features of the subsurface formation at a spatial location in the wellbore. The method includes selecting at least one previous time window from a number of previous time windows that includes a previously cached dataset that was detected by the at least one sensor or a different sensor in the wellbore and that spatially overlaps with the spatial location for the current dataset. The method includes merging the current dataset with the previously cached dataset to create a merged dataset. The method includes selecting a machine learning model from a plurality of machine learning models for the spatial location in the wellbore based on the merged dataset.

20 Claims, 14 Drawing Sheets

(56) References Cited

U.S. PATENT DOCUMENTS

| | | | |
|---|---|---|---|
| 11,200,514 B1 | 12/2021 | Chen et al. | |
| 11,236,607 B2 * | 2/2022 | Tubel | E21B 47/18 |
| 11,480,709 B2 | 10/2022 | Thorne et al. | |
| 2006/0173625 A1 | 8/2006 | Moran | |
| 2010/0063948 A1 | 3/2010 | Virkar et al. | |
| 2013/0124176 A1 | 5/2013 | Fox et al. | |
| 2015/0218914 A1 | 8/2015 | Marx et al. | |
| 2016/0132787 A1 | 5/2016 | Drevo et al. | |
| 2017/0032279 A1 | 2/2017 | Miserendino et al. | |
| 2018/0143616 A1 | 5/2018 | Robello et al. | |
| 2018/0347354 A1 | 12/2018 | Li et al. | |
| 2019/0108460 A1 | 4/2019 | Chien et al. | |
| 2019/0156247 A1 * | 5/2019 | Faulhaber, Jr. | G06N 3/045 |
| 2019/0277130 A1 | 9/2019 | Losoya et al. | |
| 2020/0132875 A1 | 4/2020 | Zhang et al. | |
| 2020/0184494 A1 | 6/2020 | Joseph et al. | |
| 2020/0284942 A1 | 9/2020 | Chen et al. | |
| 2021/0011920 A1 * | 1/2021 | Sudarsan | G06F 16/243 |
| 2021/0123343 A1 * | 4/2021 | Zhou | E21B 7/04 |
| 2021/0140298 A1 * | 5/2021 | Bakulin | G06F 18/24 |
| 2021/0224687 A1 * | 7/2021 | Goldszmidt | G06F 18/2415 |
| 2021/0304057 A1 * | 9/2021 | Kundu | G06N 5/02 |
| 2022/0018221 A1 | 1/2022 | Zhang | |
| 2022/0027538 A1 * | 1/2022 | Walters | G06F 30/28 |
| 2022/0137568 A1 * | 5/2022 | Singh | E21B 21/08 175/24 |
| 2022/0170359 A1 * | 6/2022 | Boualleg | G06N 20/20 |
| 2022/0284330 A1 * | 9/2022 | Ambrus | E21B 44/00 |
| 2022/0405578 A1 * | 12/2022 | Antonides | G06F 18/214 |
| 2023/0041525 A1 * | 2/2023 | Hong | G01V 3/38 |

FOREIGN PATENT DOCUMENTS

| | | |
|---|---|---|
| NO | 20210792 | 1/2022 |
| WO | 2013188241 A2 | 12/2013 |
| WO | 2018117890 A1 | 6/2018 |
| WO | 2019204555 A1 | 10/2019 |
| WO | 2020139347 | 7/2020 |
| WO | 2021040791 A1 | 4/2021 |
| WO | 2021150929 | 7/2021 |
| WO | 2022015335 A1 | 1/2022 |
| WO | 2023033857 | 3/2023 |

OTHER PUBLICATIONS

"U.S. Appl. No. 16/932,056, Non-Final Office Action", Jul. 18, 2023, 15 pages.
GB Application No. 2108570.9, Combined Search & Examination Report, mailed Dec. 16, 2021, 7 pages.
PCT Application Serial No. PCT/US2020/042698, International Search Report, mailed Apr. 2, 2021, 3 pages.
PCT Application Serial No. PCT/US2020/042698, International Written Opinion, mailed Apr. 2, 2021, 4 pages.
Norwegian Application Serial No. 20210792; First Office Action; Sep. 16, 2021, 4 pages.
Elseaidy, "Static and Dynamic Analysis of Real-Time Systems", In Proceedings of the 30th annual Southeast regional conference (ACM-SE 30). Association for Computing Machinery, New York, NY, USA, 368-376. doi: https://doi.org/10.1145/503720.503801.
Leontjeva, et al., "Combining Static and Dynamic Features for Multivariate Sequence Classification", 2016 IEEE International Conference on Data Science and Advanced Analytics (DSAA), 2016, pp. 21-30. doi: 10.1109/DSAA.2016.10.
"U.S. Appl. No. 16/932,056, Non-Final Office Action", Dec. 7, 2022, 22 pages.
"PCT Application No. PCT/US2021/071335, International Search Report and Written Opinion", May 26, 2022, 10 pages.
"NO Application No. 20231244 First Office Action", May 12, 2025, 6 pages.

* cited by examiner

CURRENT DATASET IN A CURRENT TIME WINDOW

PREVIOUSLY CACHED DATASET)

MERGED DATASET WITH ADDED INTERPOLATED DATA

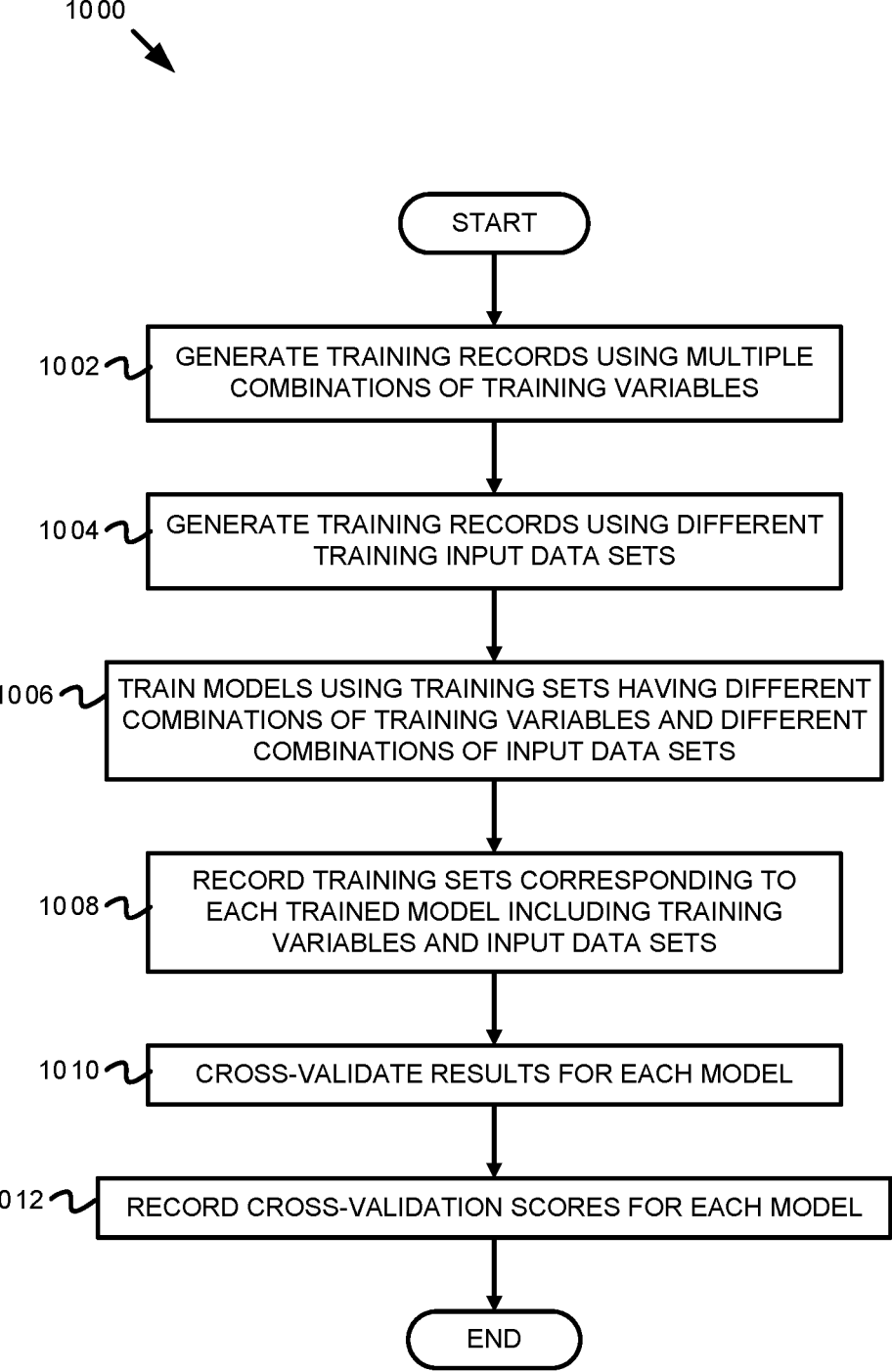

1000

START

1002 — GENERATE TRAINING RECORDS USING MULTIPLE COMBINATIONS OF TRAINING VARIABLES

1004 — GENERATE TRAINING RECORDS USING DIFFERENT TRAINING INPUT DATA SETS

1006 — TRAIN MODELS USING TRAINING SETS HAVING DIFFERENT COMBINATIONS OF TRAINING VARIABLES AND DIFFERENT COMBINATIONS OF INPUT DATA SETS

1008 — RECORD TRAINING SETS CORRESPONDING TO EACH TRAINED MODEL INCLUDING TRAINING VARIABLES AND INPUT DATA SETS

1010 — CROSS-VALIDATE RESULTS FOR EACH MODEL

1012 — RECORD CROSS-VALIDATION SCORES FOR EACH MODEL

END

FIG. 10

MACHINE LEARNING MODEL SELECTION BASED ON FEATURE MERGING FOR A SPATIAL LOCATION ACROSS MULTIPLE TIME WINDOWS

BACKGROUND

The disclosure generally relates to data processing and in particular to machine learning model selection based on feature merging for spatial location across multiple time windows.

During drilling of a wellbore, downhole test tools may be deployed in a bottom hole assembly (BHA) or elsewhere along the drill string to detect and measure various formation properties. Such downhole testing may also or alternatively be implemented by wireline test tools deployed following or between drilling cycles. Such test tools may include multi-component induction (MCI) and nuclear magnetic resonance (NMR) tools that measure electromagnetic return signals that can be interpreted to determine higher-level formation properties such as porosity, permeability, and density of formation materials such as rock strata and fluids. Many different downhole test tools are utilized for measuring various electrical, acoustic, nuclear radiation, and other measurable metrics that can be interpreted individually and/or in various combinations to determine mechanical, chemical, and other formation properties. The directly measurable metrics may also be used to determine higher-level formation material classifications such as lithology. The interpretation process to determine property classifications from measured data may require substantial processing and user resources.

BRIEF DESCRIPTION OF THE DRAWINGS

Embodiments of the disclosure may be better understood by referencing the accompanying drawings.

FIG. 10 depicts a flowchart of example operations to generate machine-learning models, according to some embodiments.

DESCRIPTION OF EMBODIMENTS

Figure 1:
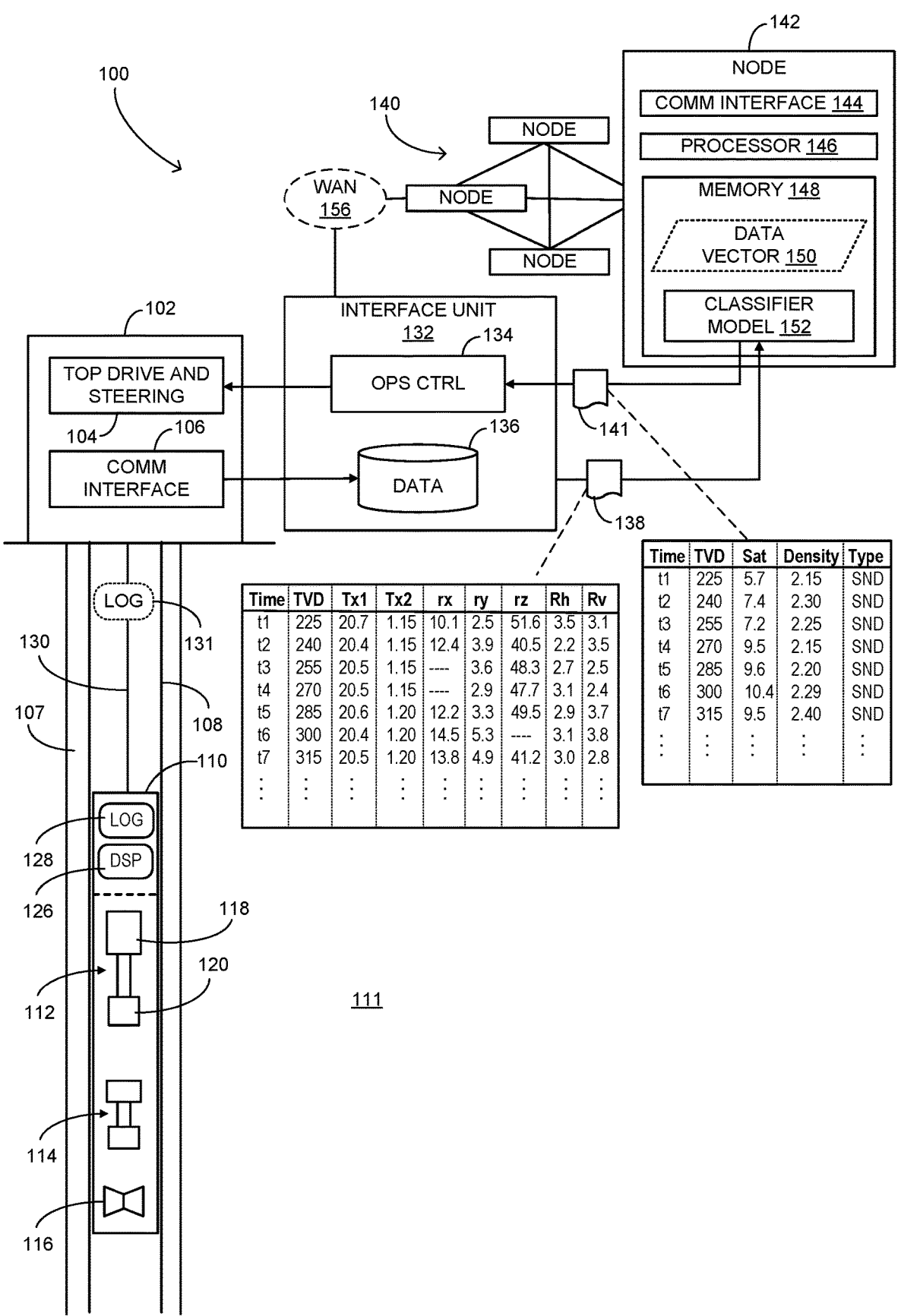
FIG. 1 depicts an example system for selection of a machine learning model based on feature merging for a given spatial location across multiple time windows, according to some embodiments.

The description that follows includes example systems, methods, techniques, and program flows that embody embodiments of the disclosure. However, it is understood that this disclosure may be practiced without these specific details. For instance, this disclosure refers to geoscience and geology applications with regard to dynamic selection of machine learning models in illustrative examples. Embodiments of this disclosure can be also applied to any other type of applications for interpretation or prediction of data as described herein. In other instances, well-known instruction instances, protocols, structures and techniques have not been shown in detail in order not to obfuscate the description.

Example embodiments can include the application of machine learning models for real time prediction and interpretation of data. For example, some embodiments can include application of machine learning models for real time prediction and interpretation of data in the geoscience and geology domains. Some embodiments can include processing of real time data that may not have a fixed format, scheduling (or timing) or sampling intervals that can be defined prior to receipt of such data. Rapid and accurate interpretations of this real time data can be treated as a special case of real time prediction and interpretations of data in a time-series.

For certain applications (such as geoscience and geology applications) that may not have a specific format of the data received, making predictions using a real time data being received or streamed can be problematic. For example, the format of the data can vary between wellbores, can vary over time due to the condition of wellbores, and can vary between the logging tools used to detect the data. Such variation of the data can be a significant challenge for the generalized application of machine learning to data received in real-time from a wellbore. Example embodiments can process such data and select a most suitable machine learning model in near real time to make predictions and interpretations. Such embodiments can enable timely and accurate decisions at the wellsite.

In addition to a variable data formation, there might be time lags of the real time streaming data. Real time data received in certain applications (such as the geoscience and geology applications) can be associated with a spatial position (x, y, z). For these applications, spatial position can more important than the time at which the data is received. Example embodiments can combine data across multiple time windows for a same spatial location as part of the selection of a machine learning model for this spatial location. Therefore, in example embodiments, additional operations can be required to (1) calibrate data received at different steps and (2) determine an optimal sample size of prediction and interpretation window that can use as many features for the machine learning models to deliver accurate interpretations and predictions without causing severe delays. Additionally, the selected machine learning model can be used to accurately perform predictive formation evaluation for the spatial location in or close to real time.

Thus, example embodiments can include selection of a machine learning model to enable prediction for real time streaming data on a point-by-point spatial location basis. Accordingly, example embodiments can avoid the bias of making predictions for an entire dataset using a single machine learning model. Also, example embodiments can include using supervised machine learning models that can retrieve, combine, and search for features available that were received at different points in time for a given spatial location or depth. Thus, example embodiments can allow for more accurate real time interpretations and predictions to be made.

In terms of the required response time (from the time a data point is received to the time the interpretation/prediction of that data point is relayed back), a single prediction time window can be selected. A determination can be made of which previous time windows can be used such that data from these previous time windows can be merged with data from the current time window. This determination can be based on which previous time windows include data for features that spatial overlap with the current time window. This merged dataset along with which features will be selected can be used to select a most suitable machine learning model for this spatial location. Selection of the machine learning model can be based on the number of features, calculated prior probabilities that measure the similarity between training data and the data being input into the machine learning models, and the accuracy of the pre-trained machine learning models. The selected machine learning model can then be used to make interpretations or predictions regarding the subsurface formation for the given spatial location (predictive formation evaluation).

Thus, in contrast to conventional approaches, example embodiments can provide a recommended machine learning model for real time streaming data for a given spatial location or depth. Thus, example embodiments can avoid the bias of making predictions for entire datasets using a single machine learning model. Also, in contrast to conventional approaches, example embodiments can merge feature data across different time windows for a given spatial location or depth as part of providing the recommended machine learning model. Such embodiments can provide more accurate real time predictions for non-static real time streaming data during hydrocarbon recovery operations. Thus, such embodiments can result in significant savings of time and money by providing rapid and reliable predictions to help making better decisions during such operations.

Thus, supervised machine learning pipelines can be applied on various real time data streams in geoscience and geophysical data, which can assist onsite drilling engineers/ geologists to interpret logs at any points of drilling, evaluation, production, etc. Example embodiments can include a supervised machine learning pipeline that can process different available data types at different time steps in a same spatial location or depth for rapid and reliable interpretations/predictions.

Such data can then be used to access the ability of one or more machine learning models to make valid predictions on each data point in each current time window based on the number of features, calculated prior probabilities that measure the similarity between the training data and real time data being received, and the accuracy of pre-trained models.

Example embodiments can include pre-processing operations to address two challenges for non-static real time streaming data that can be used for interpreting geological features, geo-bodies and/or to help make critical decisions during natural resource exploration.

In many domains, real-time interpretations and predictions are based on the time at which data is received. However, in contrast, the geoscience domain includes real-time interpretations and predictions that can normally be needed for a given spatial location or depth.

In order to account for time lags and differences of varying input features through time, example embodiments can include a multi-step cache and retrieval pre-processing. In a first step, for a given a specified frequency of updating the interpretation, the real time data can be cached at a centralized shared storage, as one time window. Such data can be stored with related metadata such as the received time, the spatial location, the size, etc.

In second step, for any current time window, the cached historical data for a certain time period can be retrieved. Such embodiments allow for the merging or combining of data in a current time window with data from a subset of historical data received during previous time windows. The subset of historical data to be merged or combined includes data that spatially overlaps with the data in the current time window. This merging or combining of data across multiple time windows is performed because the historical data may contain different features at the same spatial location due to the time lags and differences of the receiving tools.

Example embodiments can address the first non-static issue by training numerous machine learning models using historical training datasets before the real time processing. These historical training datasets can have different data distributions and different sets of features. The machine learning model that is likely to deliver the most accurate predictions on data retrieved from the preprocessing step can be selected based on a calculated probability (as further described below). Therefore, example embodiments can make real time interpretations for the current prediction window with data received at different timesteps for the same spatial location or depth.

Example System

FIG. 1 depicts an example system for selection of a machine learning model based on feature merging for a given spatial location across multiple time windows, according to some embodiments. In particular, FIG. 1 depicts a system 100 that performs formation evaluation of features from downhole in a wellbore. Formation evaluation can include detection, capturing and collection of data defining such features. The system 100 includes a well head 102 for drilling a wellbore 107 within a formation 111. The system 100 also includes devices, components, etc. for evaluating features of the formation 111. In some embodiments, the formation 111 can include hydrocarbons, such that the system 100 allows for recovery of such hydrocarbons.

The wellhead 102 includes a top drive and steering equipment 104 and a communication interface 106. The top drive and steering equipment 104 include systems and components configured to provide torque to a drill string to drill the wellbore 107. The top drive and steering equipment 104 further include a control interface for generating and transmitting steering control signals to steering components on the drilling string such as rotary steerable system components.

The communication interface 106 can be configured to provide signal communication with locally networked components such as downhole measurement tools and a local processing interface unit 132. The communication interface 106 may include components configured to enable multi-lateral signal transmission between processing nodes within a machine-learning system 140, a downhole measurement tool 110, and other local components. During measurement logging operations, the measurement tool 110 can be disposed (e.g., via wireline or logging while drilling (LWD)) at various depths within the wellbore 107 while communicatively coupled to the communication interface 106 via a telemetry link 130. The telemetry link 130 may comprise components and connectivity media for establishing acoustic, optical, electronic, and/or electromagnetic communications links between the measurement tool 110, the interface unit 132, and the machine-learning system 140.

Whether deployed in a wireline or LWD configuration, the measurement tool 110 may be deployed within a tubing string 108 in the wellbore 107. The tubing string 108 may comprise drilling tubing such as drill pipes, production tubing, injection tubing, or other type of movable tubing. The wellhead 102 may include components for configuring and controlling deployment in terms of insertion and withdrawal within the wellbore 107 of a test string that incorporates the measurement tool 110. The test string may be configured as a wireline test string deployed in the absence of or within the tubing string 108 and may include a wireline cable represented as the telemetry link 130 for moving and providing communication and power source connectivity for downhole test tools.

The measurement tool 110 comprises one or more logging sondes that house various downhole measurement tools including a multi-component induction (MCI) tool 112, a nuclear magnetic resonance (NMR) tool 114, and an acoustic measurement tool 116. The MCI tool 112 includes a multi-coil antenna array including a transmitter 118 and one or more receivers 120. Resistivity measurement tools such as the MCI tool 112 may use a triaxial antenna configuration that enables multi-component electromagnetic field measurements in three dimensions. The transmitter 118 may therefore include one or more transmit antennas configured to transmit at multiple different geometric orientations. The receivers 120 may comprise a set of receiver antennas configured to receive at multiple different geometric orientations.

The signals measured by the receivers 120 may be translated by inversion computation processes into dimensionally specified resistivity and/or conductivity values. For example, if processed using a transverse isotropic modeling technique, the measured voltage signal components may be translated to a horizontal resistivity, Rh, that represents the x-y plane, and a vertical resistivity, Rv, in the z-direction. If processed using a biaxial anisotropy modeling technique, the measured voltage components are translated into three mutually orthogonal horizontal resistivity components. Similar to the MCI tool 112, the NMR tool 114 and the acoustic measurement tool 116 may include transmitter components for inducing responses and receiver components for measuring and, in some instances, translating corresponding signal responses.

The measurement tool 110 further includes an electronics assembly comprising, in part, a digital signal processor (DSP) 126 configured to process and convert raw measurement signals from receivers within the MCI tool 112, the NMR tool 114, and the acoustic measurement tool 116 into measurement data. For example, the DSP 126 may be configured to determine target metric values (e.g., voltage levels) corresponding to the signal information received directly from the measurement tools. The electronics assembly further includes a log unit 128 that is configured to compute measurement values from the target metric values determined by the DSP 126. In some embodiments, the log unit 128 can apply an inversion computation to derive the resistivity values from the raw measurement data from the DSP 126.

The generated measurement data may be recorded by the log unit 128 in defined data object structures such as a log file 131. The log file 131 can be transmitted from the electronics assembly to the communication interface 106 from which it may be routed to and recorded in a test measurement storage 136 within the interface unit 132. The log file 131 may also or alternatively be provided directly as streamed data or otherwise real-time formatted data to a processing node within the machine-learning system 140. As represented by illustrative records within data records 138, the log file 131 can include multiple records that each associate a borehole depth (depicted as true vertical depth (TVD)) with the corresponding measurements collected at the depth. For instance, the third row-wise record within the data records 138 associates resistivity measurements Rh=2.7 and Rv=2.5 (e.g., ohms-m) with the TVD of 255 depth units (e.g., meters, feet) at which the measurements were collected. The third row-wise record further includes lower-level measurement datapoints including first and second transmitter values Tx1 and Tx2 (e.g., frequency and amplitude) and three received signal values rx, ry, and rz. In this manner, each row-wise record forms a multivariate data vector having variable types Rh, Rv, Tx1, Tx2, rx, ry, and rz to be classified by processing components within the machine-learning system 140. The collection of multiple data vectors within data records 138 can form a dataset.

As further described below, example embodiments can include operations for selecting a machine learning model from a number of machine learning models based on merging of features (for a given spatial location or depth) from a dataset in a current time window and dataset(s) from previous time window(s). The datasets from the different time windows can be generated by the measurement tool 110. The data in these datasets can related to different features or properties of the subsurface formation in which the wellbore is being formed within. Such data may be stored, combined, and analyzed by formation analysis programs to evaluate the formation. Also, the machine-learning system 140 in combination with the interface unit 132, the wellhead 102, and the downhole equipment may utilize such data for controlling or modifying control of drilling and other operations.

In some embodiments, the interface unit 132 and/or the wellhead 102 can include an operations controller 134 that generates and transmit control signals to the top drive and steering equipment 104. The control signals can be transmitted to the top drive and steering equipment 104 in direct, real-time sequential association with the sequence of formation properties data 141 received from a classifier model 152. The operations controller 134 may utilize the formation properties data 141 as a supplement to or otherwise in conjunction with other input or pre-programmed information to generate and transmit control setting signals for setting and modifying drilling and steering operations.

The formation properties data 141 includes multiple records that each associate a spatial location or borehole depth (depicted as true vertical depth (TVD)) with corresponding to measurement depths recorded in data records 138. For instance, the third row-wise record within the formation properties data 141 corresponds by depth and time to the third row-wise record within the data records 138. Each row-wise record of the formation properties data 141 further includes three formation properties fields including a water saturation field, "Sat," a density field, "Density," and a lithology type field, "Type." In some embodiments, one or more of the Sat, Density, and Type fields contain a label or classifier generated by classifier model based on the input data vector formed by the third row of the data records 138. For example, the third row-wise record of the formation properties data 141 classifies the data pattern that includes resistivity measurements Rh=2.7 and Rv=2.5 and one or more of the transmitter values and receiver signal values forming the pattern as corresponding to one or more of water saturation=7.2, density=2.25, and/or sandstone lithology type "SND."

The operations controller 134 can generate the control settings in response to or otherwise based on classification information generated by and received from the machine-learning system 140 via a local connection or via a wide area network 156. The interface unit 132 can include components such as electronic transmission and/or fluid pressure signal generating components for remotely communicating the control settings. In some embodiments, the interface unit 132 can transmit control setting signals to downhole devices via the communication interface 106. Alternatively, the interface unit 132 and downhole drilling and steering equipment may include wireless communication interfaces enabling communication with downhole and surface devices using, for example, acoustic telemetry via the metal piping of or fluid within the tubing string 108.

The machine-learning system 140 can include a multi-processor system including multiple interconnected processing nodes that may collectively form a parallel processing system that implements one or more types of machine-learning such as a neural network in which each node is a respective node of the neural network. The machine-learning system 140 can comprise any combination of hardware, firmware, and software program logic configured to implement one or more artificial intelligence schemas such as linear regression, support vector machines, k-Nearest Neighbor (k-NN), and other supervised learning algorithms.

The interface unit 132 can generate the data records 138 from measurement data recorded in a data storage 136. The interface unit 132 can transmit the data records 138 to one or more of the computation nodes, such as a node 142, within the machine-learning system 140. The node 142 can comprise processing and memory components as well other hardware and software components for receiving, storing, processing, and transmitting information to and from the interface unit 132. The operations controller 134 may generate data records 138 based on various combinations of measurement data within the data storage 136 such as by correlating measurement depths and/or timestamp values between recorded measurements to provide a time sequence of temporally and spatially corresponding measurement data. The data sequence can be processed by the machine-learning system 140 to determine formation properties in the form of supervised classifications recorded in formation properties data 141.

The node 142 can include a communication interface 144 that comprises any combination of hardware and software, such as network adapter components, configured to enable communication with the other nodes within the machine-learning system 140 and the interface unit 132. The node 142 can also include a processor 146 and a memory 148 for storing, executing, and otherwise processing program code and input data including the classifier model 152 and a data vector 150. The classifier model 152 may comprise a run-time-selectable plugin program or routine including program instructions configured to determine formation property classifications based on the content of data vector 150. The feature or formation property classifications may comprise a fixed set of labels (e.g., high, medium, low permeability) that each characterize various levels physical properties such as porosity, density, lithology, etc. The classifier model 152 may be generated, in part, by a model generator that generates pattern recognition code by executing a classification trainer program.

The data vector 150 may comprise one of the data vectors within the data records 138. The data vector 150 can be a multivariate vector data construct that includes specified parameters that in combination indicate a multivariate pattern. In some embodiments, the pattern includes multiple formation measurements and associated test input signals for a given time window. A series of data vectors such as the data vector 150 may be included within a dataset such as the data records 138 and received as input and processed by classifier models such as the classifier model 152 to generate feature or formation property classifications. A current operational configuration (e.g., drilling) can be modified based on the feature or formation property classifications. Additionally, this process can be repeated as necessary based on a series of subsequent measurement time windows or cycles. In this manner, operational adjustments may be implemented based on changes in features or formation properties.

Figure 2:
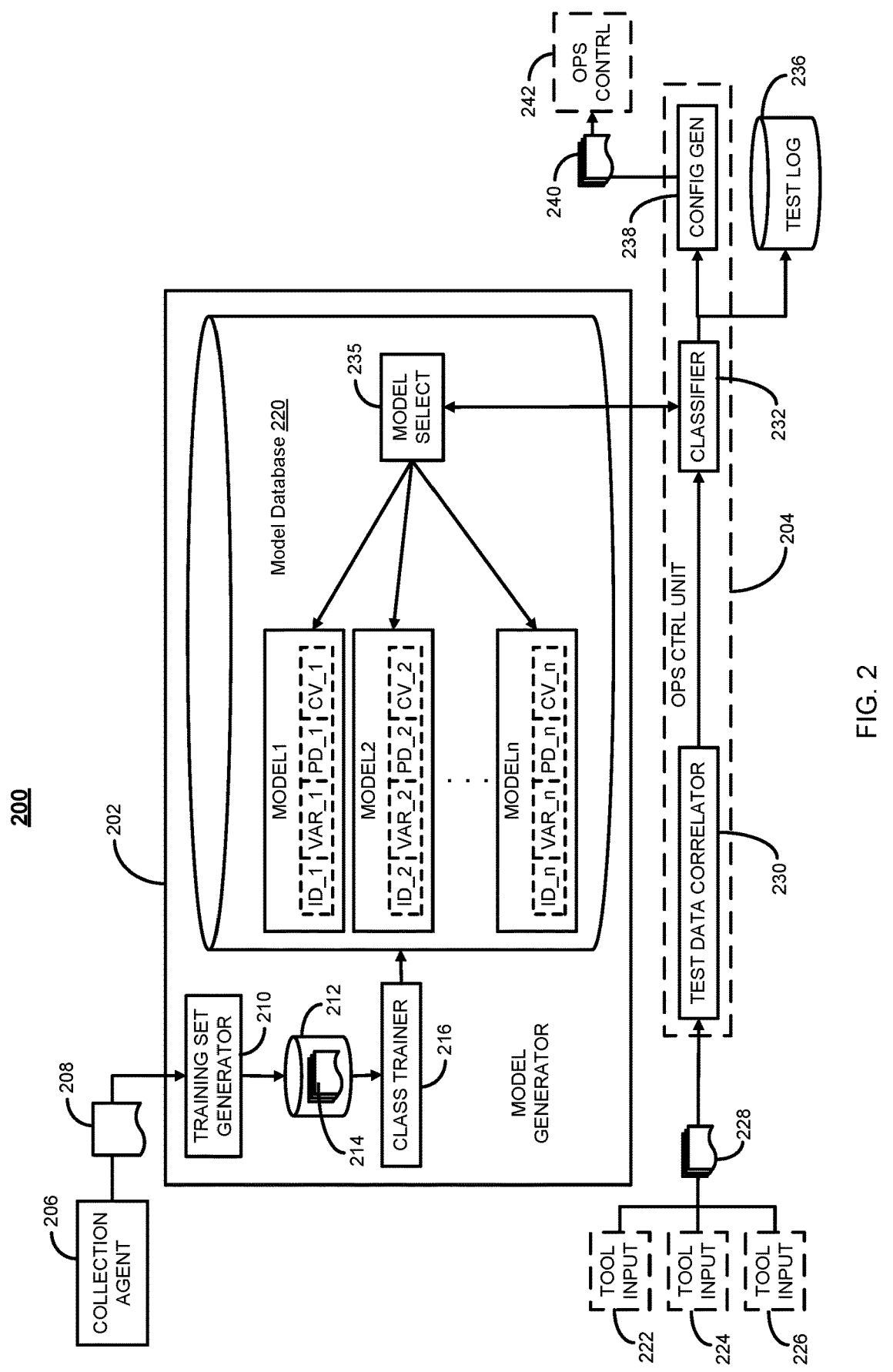
FIG. 2 depicts an example system for machine learning model generation and selection, according to some embodiments.

FIG. 2 depicts an example system for machine learning model generation and selection, according to some embodiments. FIG. 2 depicts a system 200 that includes subsystems, devices, and components, which may be incorporated by and perform the function of the various of the data collection devices and the processing devices in the machine-learning system shown in FIG. 1. The system 200 includes a model generator 202 comprising components for generating a machine learning model repository in the form of a model database 220. The model generator 202 incudes a training set generator 210 that is configured to generate and record statistical properties of training sets 214 within a training set database 212.

In the depicted embodiment, training set generator 210 receives measurement and formation properties data 208 such as may be collected by a collection agent 206 that retrieves the data from a variety of information sources such as well field data repositories. Measurement and formation properties data 208 may include lower level measurement tool data such as voltages, signal frequencies, and radiation levels as well as higher level, translated measurement tool data including resistivities, densities, etc. Data 208 may further include higher-level formation properties such as lithologies and chemical compositions. Training set generator 210 is configured, using any combination of program instructions and data, to correlate the test measurement data with lower level properties data to form classified (sometimes referred to as "labelled") training sets within training sets 214. Specifically, a lower level property may be assigned as the classifier label for a multivariate set of measurement data points and/or other properties. Training set generator 210 is also configured to correlate the test measurement data and lower level properties data with higher level formation properties data to form classified training records within the training sets in which a higher-level property (e.g., lithology type) is assigned as the classifier label for a multivariate set of any combination of lower-level measurements and lower-level properties. Each of training sets 214 therefore includes a multivariate set of training variables (e.g., tool measurements and/or lower-level properties) associated with a classifier label (e.g., lower-level or high-level property).

Model generator 202 further includes a classification trainer 216 that is configured, using any combination of program instructions and data, to generate trained MLM models that each include respectively configured pattern recognition code. Classification trainer 216 requests or otherwise receives a training data set in the form of a subset of the supervised learning training sets 214 to generate a given model. Classification trainer 216 is configured to execute a supervised learning function on the labelled training data to generate the pattern recognition code. Classification trainer 216 processes the classifier-labeled training sets to generate multiple MLM models MODEL1-MODELn each having different sets of training variables (types of training data) and different sets of training data within the types.

The models MODEL1-MODELn are recorded actually or via index within MLM library 220, which includes a model select unit 235 that is configured to selectively access and retrieve one or more of the models. The models each include respectively configured pattern recognition code based on the training data content and training variables used to generate each model. As depicted, each of models MODEL1-MODELn also includes metadata fields for recording several categories of selection information. In the depicted embodiment, each model includes an identifier field "ID_x" that records, for example, an alphanumeric model identifier. Each model also includes three metadata fields that record information relating to the training data set used to train that model. A training variable types field "VAR_x" records the set of variable types (e.g., voltage, frequency, density) included in the training set (set of training records) used to train the model. A probability distribution field "PD_x" records the probability distribution of the training data values used to train the model, and a cross-validation field "CV_x" records a cross-validation score for the model. In some embodiments, the cross-validation score represents classification accuracy based on a subset of the training data.

The models within MLM library 220 may be accessed by a control unit 204 that is configured to determine formation properties from input test data and provide the properties data for use in formation evaluation. Control unit 204 may also use the determined formation properties to determine or modify drilling or other operation configurations. Control unit 204 is configured to determine the formation properties as classifications generated by one or more of the models within MLM library 220. Control unit 204 includes a test data correlator 230 that receives and processes test data records 228 from one or more of multiple measurement tool test data sources 222, 224, and 226. Test data correlator 230 may process the test data by correlating various related measurements and low-level properties that may be usefully evaluated in combination to determine higher-level formation properties. The resultant unclassified data set comprises individual test data vectors, each comprising a respective combination of multivariate test data points.

A test data set comprising individual test data vectors are transmitted to or otherwise received by a classifier 232 that is configured, using any combination of program instructions and data, to process the test data set using the models within MLM library 220. In some embodiments, classifier 232 is configured to call or otherwise select one or more mutually distinct models from MLM library 220 to be used to classify individual test data vectors. As described and depicted in further detail with reference to FIG. 4, classifier 232 and model select unit 235 are configured to select a model for each test vector using a sequence of criteria that reduces MLM inaccuracies caused by the wide varieties of the input variable types and the training data values used to generate the models.

A test data classification sequence for a test data vector begins with classifier 232 or model select unit 235 determining the set of variable types in the test vector. For example, as part of a model request, classifier 232 may perform the determination or may transmit the test vector to be analyzed by model select unit 235. In response to model select unit 235 determining, directly or via indication from classifier 232, the set of variable types, model select unit 235 compares the set with the sets of variable types for each of the models (i.e., variable types included in the training sets for each model). Model select unit 235 performs the comparison in part by reading the associated via the VAR_x fields. In response to determining a closest match (e.g., largest set of matching variable types), model select unit 235 calls or otherwise selects the corresponding MLM model to be used to classify the test vector.

In response to determining that multiple models have closest matching sets of variable types, model select unit 235 and/or classifier 232 use comparison of probability distributions of the training data and test data values as the selection criterion. For example, classifier 232 may have pre-processed the values of the test data set in which the test vector is included to generate a probability distribution. For example, model select unit 235 and/or classifier 232 may calculate probability distributions using mean and covariance probability distribution calculations. Model select unit 235 may compare the probability distribution of the test data set with the probability distributions of each of the models that were determined to have the closest matching sets of variable types. The probability distributions for the models may be determined by reading the PD-x fields. For each comparison, model select unit 235 calculates a corresponding similarity values such as in the form of a numeric fractional or percent value. Model select unit 235 then determines whether one or more of the similarity values exceeds or otherwise meets a threshold value. In response to determining that only one of the similarity values exceeds the threshold value, model select unit 235 calls or otherwise selects the model corresponding to the exceeding similarity value and the model is used to classify the test vector.

In response to determining that two of more of the similarity values exceed the threshold value, model select unit 235 reads and compares cross-validation values stored in the CV_x field of each of the models for which the similarities values exceed the threshold value. Model select unit 235 identifies the model having the highest cross-validation value and calls or otherwise selects the model to be used to classify the test vector.

Having classified one or more test vectors in the test data set, classifier 232 transmits the classifications in the form of formation property data to configuration generator 238. Configuration generator 238 is configured to control or otherwise modify the operation settings of well equipment such as drilling and/or testing equipment. For example, configuration generator 238 may generate operation configuration control information/instructions 240 to an operational controller 242 such as a drilling controller.

Example Operations

Example operations for machine learning model selection based on feature merging for a given spatial location across multiple time windows are now described in reference to FIGS. 3-11.

Figure 3:
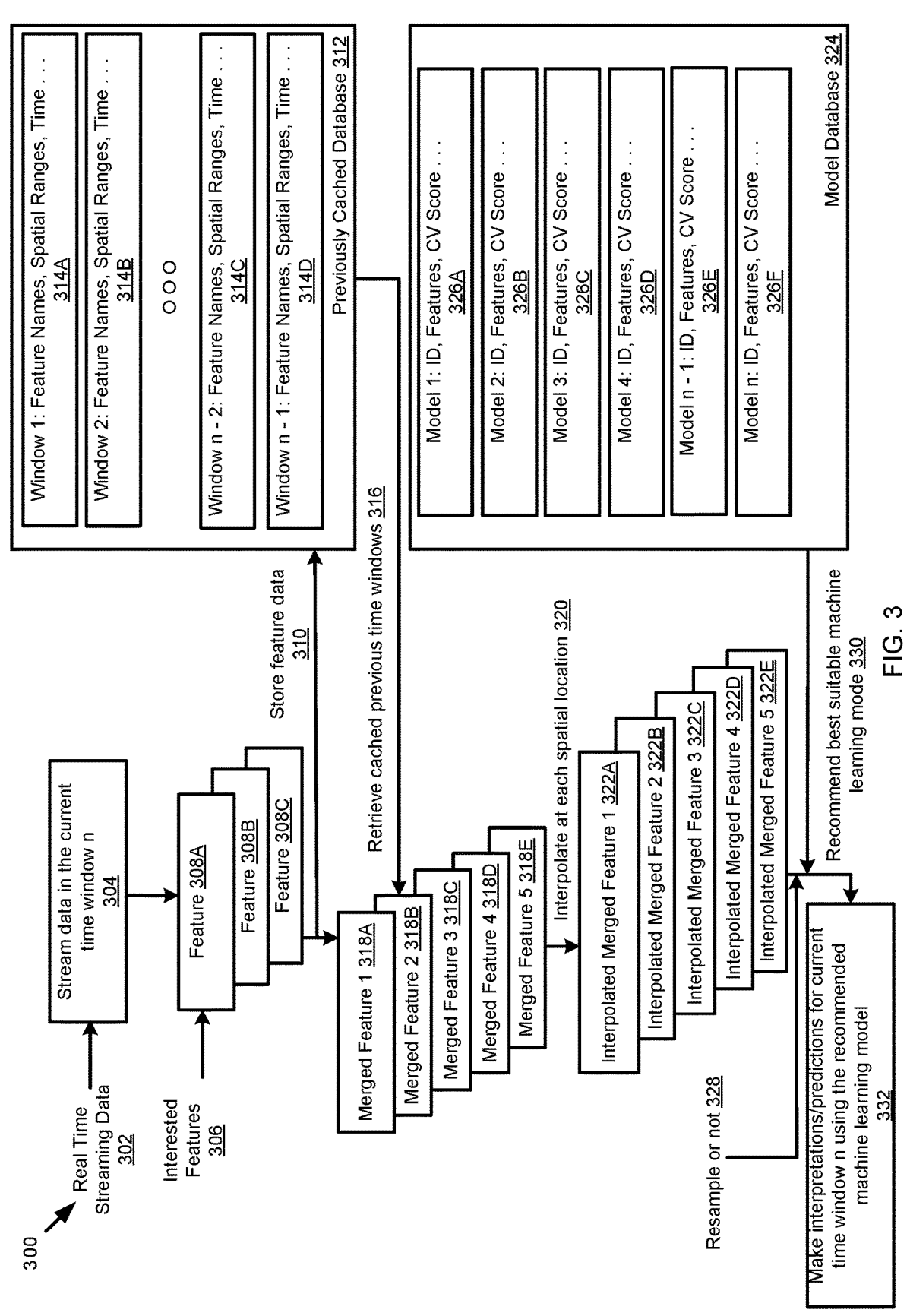
FIG. 3 depicts an example data flow diagram for selection of a machine learning model based on feature merging for a given spatial location across multiple time windows, according to some embodiments.

FIG. 3 depicts an example data flow diagram for selection of a machine learning model based on feature merging for a given spatial location across multiple time windows, according to some embodiments. In particular, FIG. 3 depicts a data flow diagram 300. Real time streaming data 302 is received for a given current time window n (stream data in the current time window n 304 ("stream data 304")). The length of the current time window can vary and can be based on different parameters and factors. For example, the length of the current time window can vary based on the required response time (which is the time a data point is received to the time that an interpretation or prediction is provided using the selected machine learning model). Alternatively or in addition, the length of the current time window can vary based on the drilling rate and other drilling parameters. The current time window can be defined (1) for a fixed time period (e.g. every minute) (2) after a fixed number of real-time data points are received (every 20 points), or (3) for a fixed depth interval.

Figure 4:
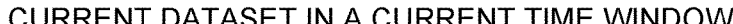
FIG. 4 depicts an example graph of a current dataset for a current time window that includes values of multiple features over a given spatial location, according to some embodiments.

To illustrate, FIG. 4 depicts an example graph of a current dataset for a current time window that includes values of multiple features over a given spatial location, according to some embodiments. FIG. 4 depicts a graph 400 of a current dataset in a current time window. The graph 400 includes a y-axis 402 that defines a spatial location. For example, the spatial location 402 can include a depth in terms of feet in a wellbore. In this example, the depth ranges just above 19,370 feet (ft.) to just below 19,430 ft.

The graph 400 includes an x-axis 404 that includes values of three different features for the subsurface formation across these depths or spatial location: At Bit Gamma Rays (ABG) 406, deep resistivity 408, and density 410. For this current time window, as shown in area 412, there are four data points for ABG 306 around a depth of 19,430 ft. As shown in area 414, there are six data points for deep resistivity 308 between the depths of 19,380 ft and 19,390 ft. As shown in area 416, there are four data points for density 310 just above 19,370 ft.

Returning to FIG. 3, the stream data 304 can include data from the various types of features for a current time window. Data associated with the features (including feature names, spatial range of where the data for the feature was captured, the time when the data for the feature was captured, etc.) can be extracted from the stream data 304. At 310, this feature data for current time window n can be stored in a previously cached database 312. Data for each feature can include a feature type, a feature number, the spatial location etc. As shown, the previously cached database 312 includes feature data across a number of previous time windows (shown as feature data for a window 1 (314A), feature data for a window 2 (314B), feature data for a window n−2 (314C), and feature data for a window n−1 (314D)).

Also, identification of what features are of interest for machine learning model selection and prediction can be input (shown as interested features 306). In particular, the stream data 304 can include features A-D but the interested features 306 can be a subset of these features (e.g., features A-C). For example, the features for the current time window may include different properties of the subsurface formation, such as density, porosity, permeability, resistivity. However, the interested features may be density and resistivity. The feature data in the stream data 304 is processed to locate the interested features 306 (features 308A-308C). The interested features 306 can be those features to be used to make interpretations or predictions of the subsurface formation using the selected machine learning model.

At 316, one or more cached previous time windows can be retrieved from the previously cached database 312. The previous time windows that can be retrieved (called retrievable previous time windows) can include any time window that includes data for any feature that overlaps with the spatial location of the current time window.

If the number of previous time windows is less than a predefined threshold and/or each of the previous time windows is within a predefined spatial range of the spatial location for the feature data of the current time window, all of the retrievable previous time windows can be retrieved from the previously cached database 312. Otherwise, only the number of retrievable previous time windows can be retrieved. The predefined threshold for the number of previous time windows can vary across different current time windows, across different wellbores, etc. For example, this threshold can be based on the required response time, processing rate, how deep the spatial location is, etc. In some implementations, the threshold value can be directly proportional to the required response time and processing rate, while being inversely proportional to the depth of the spatial location. For example, the threshold value is less when the required response time and/or processing rate are less and as the value of the depth of the spatial location increases. With regard to the predefined spatial range, this can be some range above and below the spatial location for the feature data of the current time window. The range can be in terms of actual distance (e.g., +/−50 feet), a percentage (e.g., +/−10%) of the spatial location, etc. If the number of previous time windows is not less than a predefined threshold and/or each of the previous time windows is not within a predefined spatial range of the spatial location for the feature data of the current time window, only the number of retrievable previous time windows can be retrieved.

Figure 5:
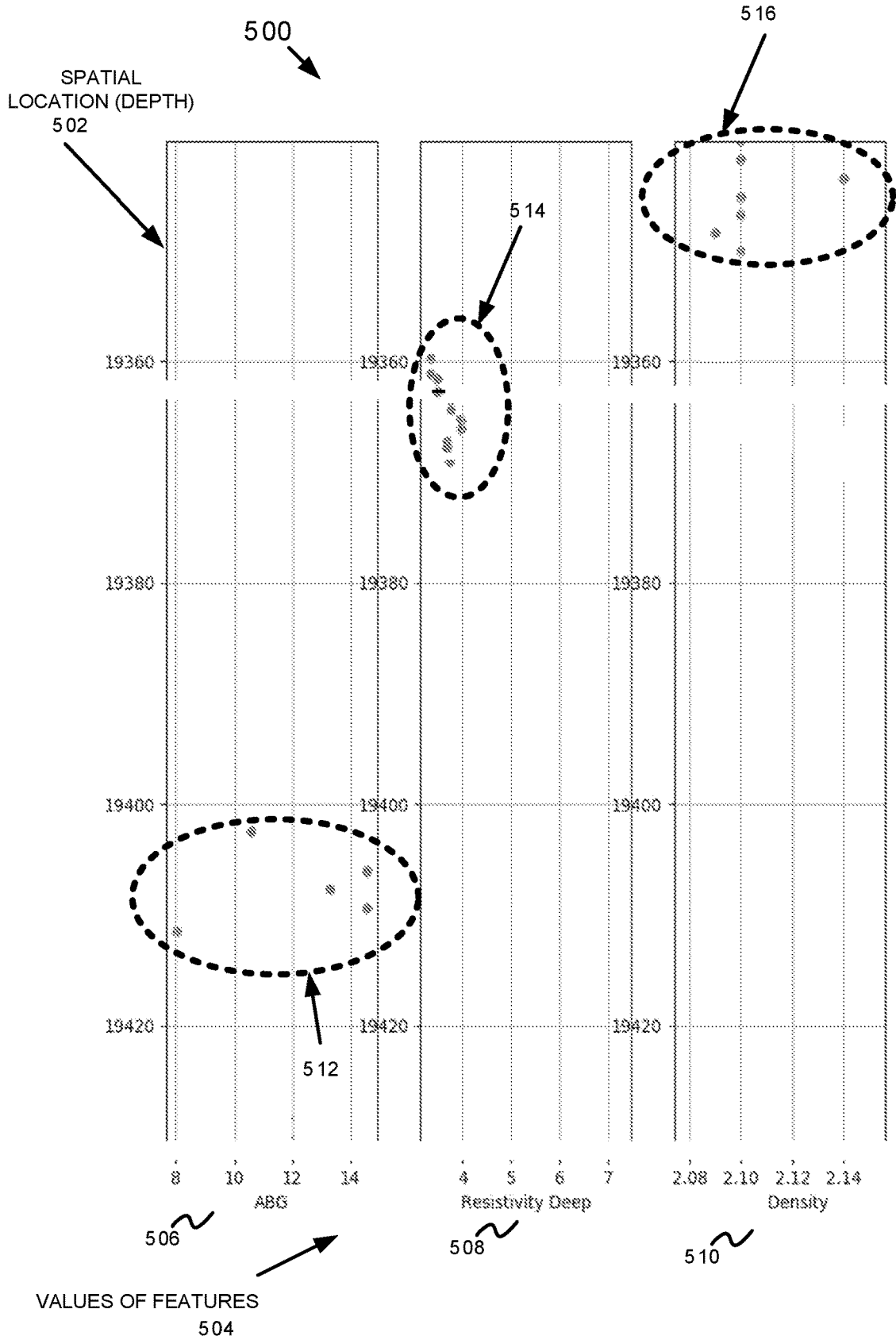
FIG. 5 depicts an example graph of a previously cached dataset for previous time windows that includes values of multiple features over the given spatial location, according to some embodiments.

To illustrate, FIG. 5 depicts an example graph of a previously cached dataset for previous time windows that includes values of multiple features over the given spatial location, according to some embodiments. In particular, FIG. 5 depicts an example graph 500 of a previously cached dataset from the previous time windows that have been retrieved from the previously cached database 312. The graph 500 includes a y-axis 502 that defines a spatial location. In this example, the depth ranges just above 19,360 ft. to just below 19,420 ft.

The graph 500 includes an x-axis 504 that includes values of three different features for the subsurface formation across these depths or spatial location: ABG 506, deep resistivity 508, and density 510. Across the previous time windows, as shown in area 512, there are five data points for ABG 506 between 19,400 ft and 19420, ft. As shown in area 514, there are 10 data points for deep resistivity 508 around 19,360 ft. As shown in area 516, there are seven data points for density 510 above 19,360 ft.

Returning to FIG. 3, the feature data from the one or more cached previously time windows retrieved from the previously cached database 312 can then be combined with the feature data for the current time window to create merged feature data—shown as merged feature 1 318A, merged feature 2 318B, merged feature 3 318C, merged feature 4 318D, and merged feature 5 318E.

Figure 6:
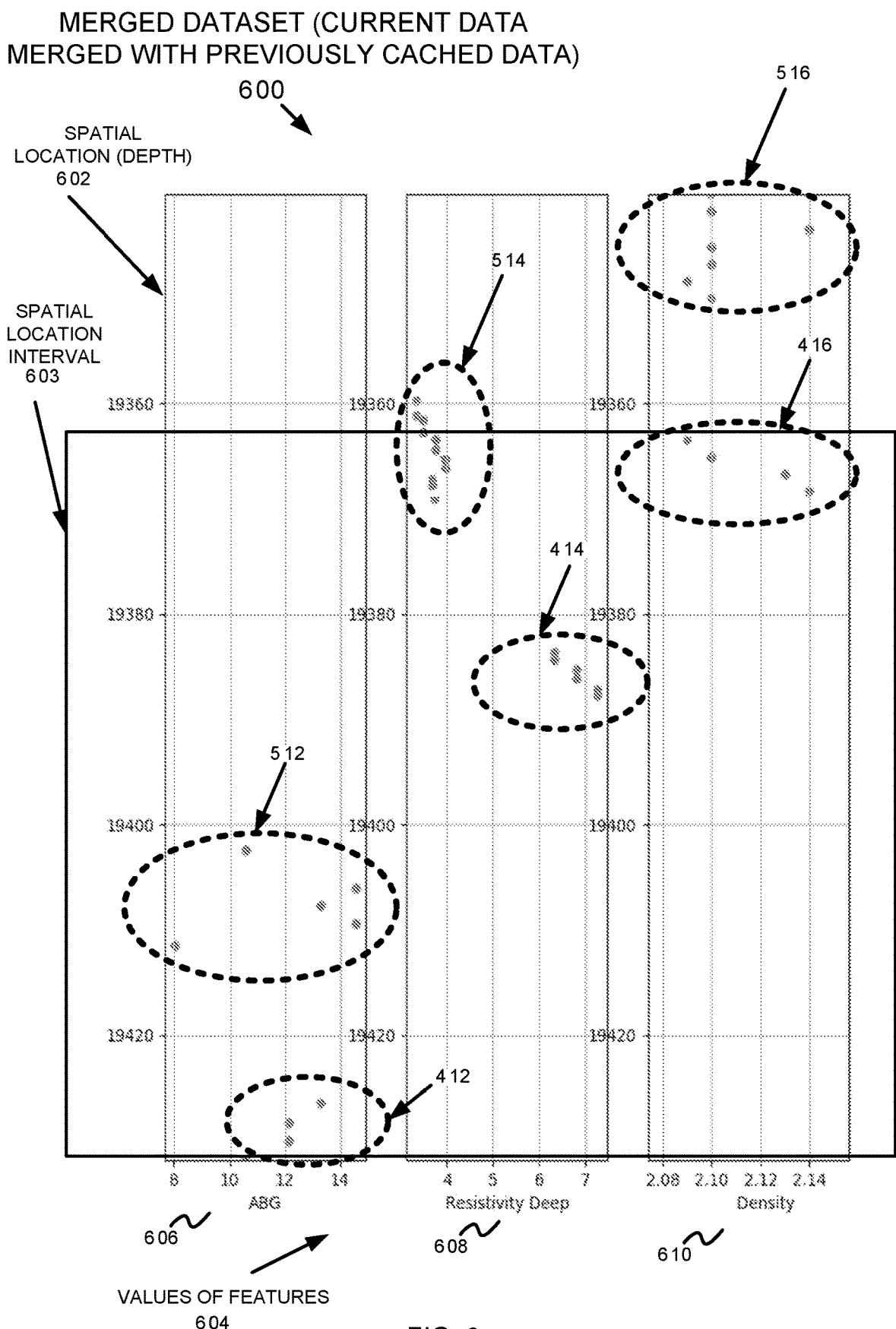
FIG. 6 depicts an example graph of a merged dataset that merges the example current dataset of FIG. 4 with the example previously cached dataset from previous time windows of FIG. 5, according to some embodiments.

To illustrate, FIG. 6 depicts an example graph of a merged dataset that merges the example current dataset of FIG. 4 with the example previously cached dataset from previous time windows of FIG. 5, according to some embodiments. In particular, FIG. 6 depicts an example graph 600 of a merged dataset. The graph 600 includes a y-axis 602 that defines a spatial location. In this example, the depth ranges just above 19,360 ft. to just below 19,420 ft. The graph 600 includes an x-axis 604 that includes values of three different features for the subsurface formation across these depths or spatial location: ABG 606, deep resistivity 608, and density 610. The merged dataset includes data points from the current time window depicted in the graph 400 of FIG. 4 and data points from the previous time windows depicted in the graph 500 of FIG. 5. In particular, the graph 600 includes the data points from the graph 400 that include (1) data points from the area 412, (2) data points from the area 414, and (3) data points from the area 416. The graph 600 also includes the data points from the graph 500 that include (1) data points from the area 512, (2) data points from the area 514, and (3) data points from the area 516. Also, as shown in this example, the spatial location being processed for selection of a machine learning model is over a range of depths—spatial location interval 603. As shown, the depth range for the spatial location interval 603 is between a depth just below 19,360 ft to a depth just below 19,420 ft.

At 320, interpolation can be performed on the merged feature data. For example, interpolated data can be added to the merged dataset for one or more of the features at the same spatial location therein. For example, interpolated data points can be added at different locations defined as large gaps between the actual data points in the merged dataset for the one or more features. In FIG. 3, the merged feature data after interpolation is shown as interpolated merged feature 1 322A, interpolated merged feature 2 322B, interpolated merged feature 3 322C, interpolated merged feature 4 322D, and interpolated merged feature 5 322E.

Figure 7:
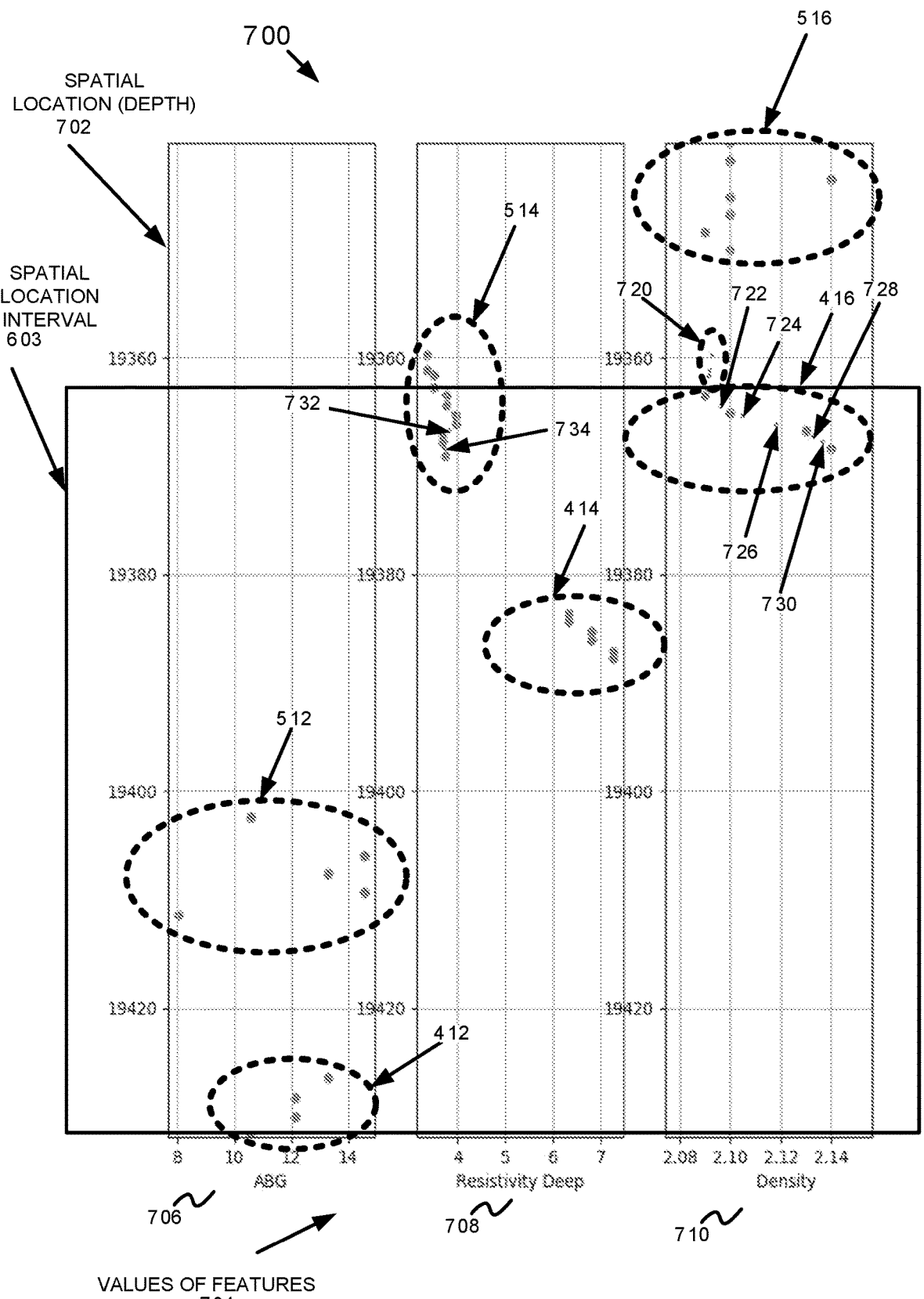
FIG. 7 depicts an example graph of the merged dataset of FIG. 6 with the addition of interpolated data, according to some embodiments.

To illustrate, FIG. 7 depicts an example graph of the merged dataset of FIG. 6 with the addition of interpolated data, according to some embodiments. In particular, FIG. 7 depicts an example graph 700 that includes a y-axis 702 that defines a spatial location. In this example, the depth ranges just above 19,360 ft. to just below 19,420 ft. The graph 700 includes an x-axis 704 that includes values of three different features for the subsurface formation across these depths or spatial location: ABG 706, deep resistivity 708, and density 710. In the graph 700, the datapoints from the merged dataset of the graph 600 of FIG. 6 are reproduced—(1) data points from the area 412, (2) data points from the area 414, (3) data points from the area 416, (4) data points from the area 512, (5) data points from the area 214, and (6) data points from the area 516.

The graph 700 also includes interpolated data that has been added to the data points. In this example, interpolated data has been added to the data points from the area 514 and the area 416. Interpolated data points 732 and 734 have been added among the data points from the area 514. Interpolated data points 720, 722, 724, 726, 728, and 730 have been added among the data points from the area 416.

Returning to FIG. 3, at 328, one or more of the data points in the current prediction window can be resampled at this point of the data flow if one or more changes regarding detecting or capturing the real time streaming data 302 has occurred since such data was received for processing (see 302 and 304 of the data flow diagram 300). For example, resampling can occur if an input sample frequency and/or a required response time has changed since the data was received. This resampled data can replace the data in the interpolated merged features 322.

As shown, FIG. 3 includes a model database 324 that includes a number of machine learning models—model 1 326A, model 2 326B, model 3 326C, model 4 326D, model n−1 326E, and model n 326F. At 330, a best suitable machine learning model (from among the machine learning models stored in a model database 324) can be selected for recommended use. In some embodiment, the machine learning model that is recommended can be based on at least one of the number of features being used for the given spatial interval, calculated prior probabilities that measure the similarity between the training data for the machine learning models and stream data in the current time window, and the accuracy of machine learning models stored in the model database 324. Example operations for generation of the machine learning models 326 stored in the model database 324 and selection of a best suitable machine learning model are further described below in reference to FIG. 11.

At 332, interpretation/prediction for the current time window n is made using the recommended machine learning model. The data for the current time window n to be input into the recommended machine learning model can be the interpolated merged features (that can include the real time streaming data (not resampled) or a resampling of at least a portion of the real time streaming data).

Figure 8:
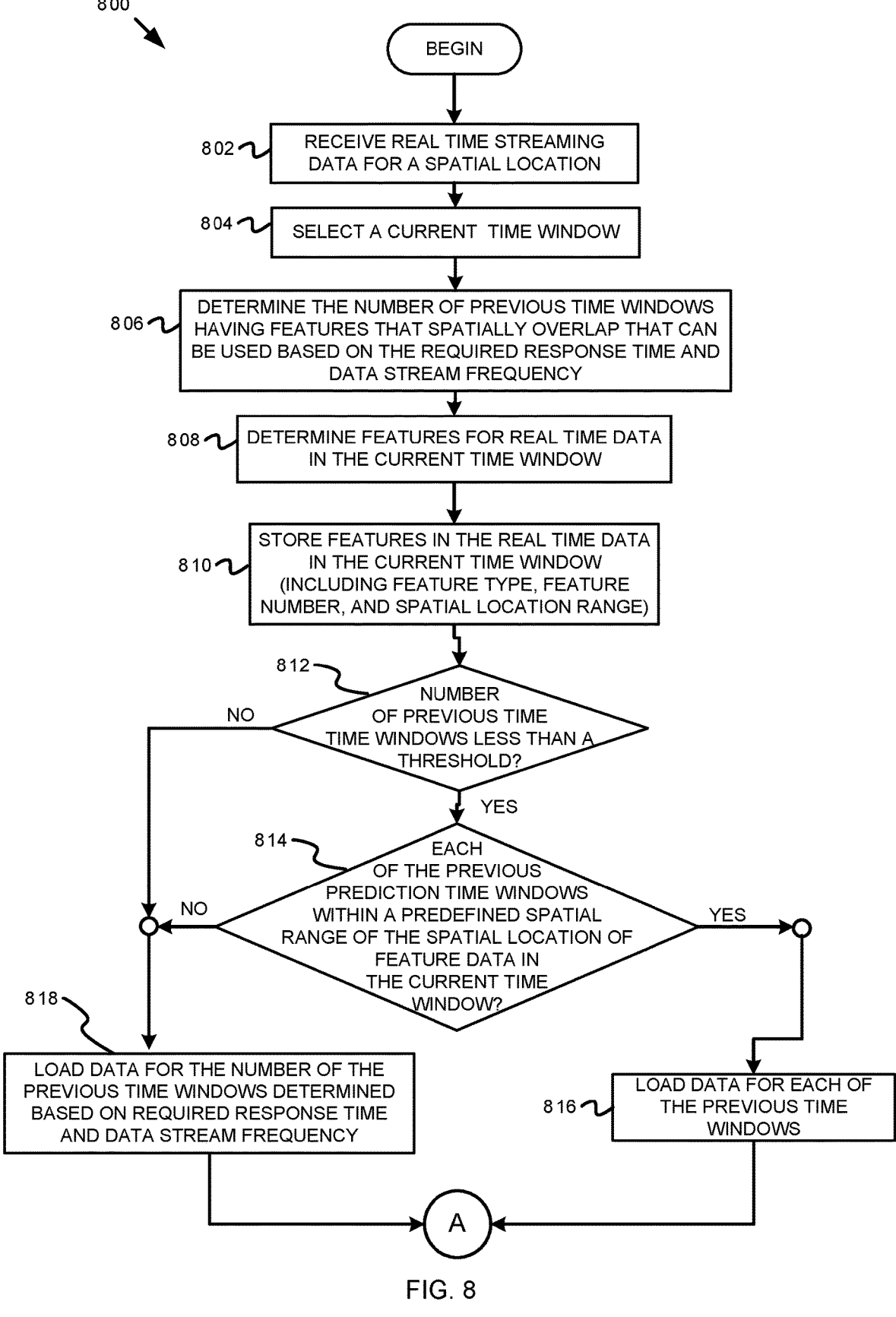
FIGS. 8-9 depict a flowchart of example operations for selection of a machine learning model based on feature merging for a given spatial location across multiple time windows, according to some embodiments.
Figure 9:
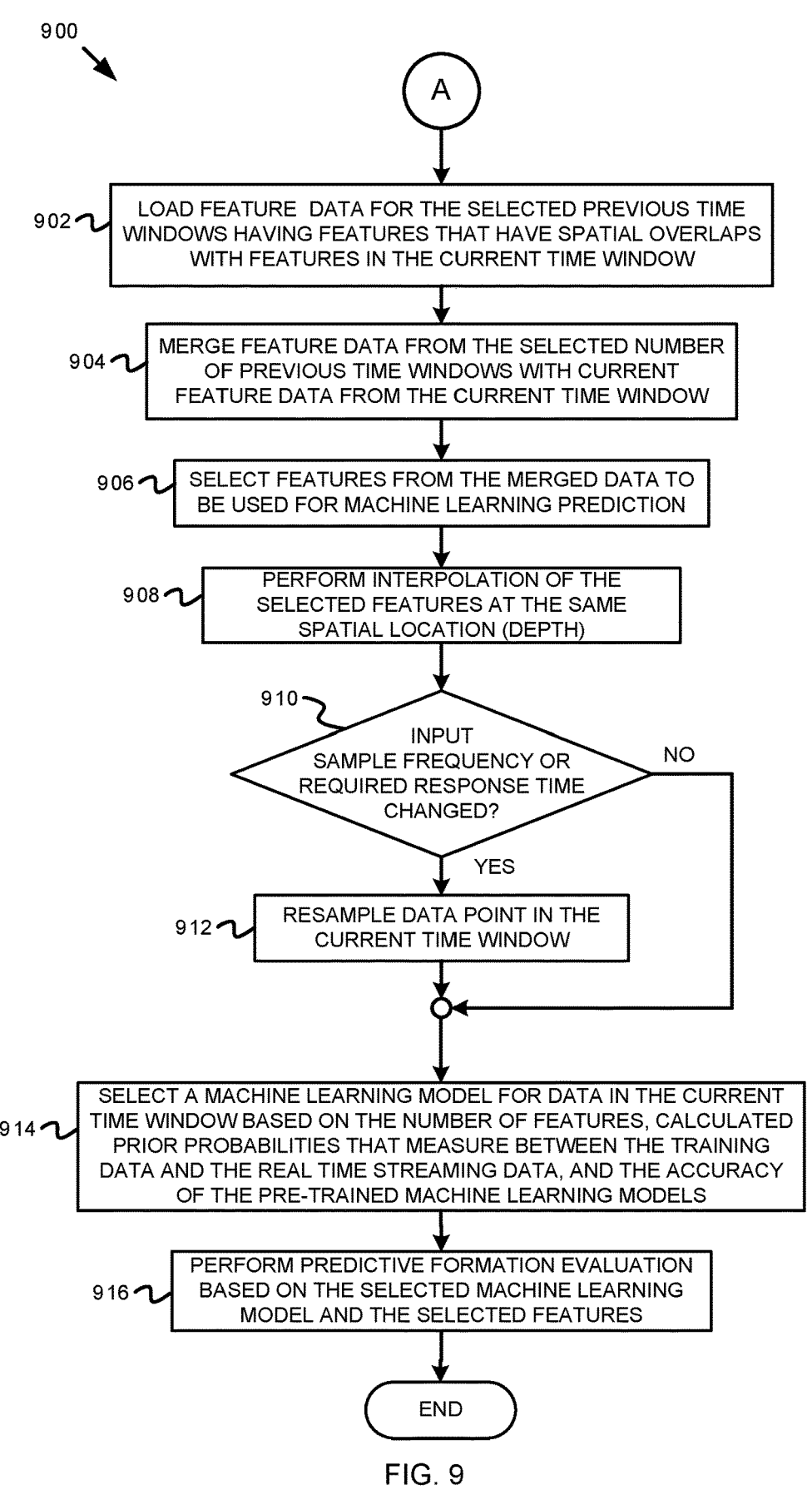

FIGS. 8-9 depict an example flowchart of operations for selection of a machine learning model based on feature merging for a given spatial location across multiple time windows, according to some embodiments. Operations of flowcharts 800-900 of FIGS. 8-9 continue through transition point A. Operations of the flowcharts 800-900 can be performed by software, firmware, hardware or a combination thereof. Such operations are described with reference to the system 100 of FIG. 1. However, such operations can be performed by other systems or components. For example, some of all of the operations can be performed by a processor downhole in the wellbore. The operations of the flowchart 800 start at block 802.

At block 802, real time streaming data for a spatial location is received. For example, with reference, to FIG. 1, the processor 146 can receive the real time streaming data for a given depth or range of depths for the wellbore 107 from the measurement tool 110. The streaming data can include data from the various types of features for a current time window. Data associated with the features can include feature names, spatial range of where the data for the feature was captured, the time when the data for the feature was captured, etc.

At block 804, a current time window is selected. For example, with reference, to FIG. 1, the processor 146 can perform this selection. As described above, the length of the current time window can vary and can be based on different parameters and factors. For example, the length of the current time window can vary based on the required response time, the drilling rate (and other drilling parameters), etc. Also, the current time window can be defined (1) for a fixed time period (e.g., every minute) (2) after a fixed number of real-time data points are received (every 20 points), or (3) for a fixed depth interval.

At block 806, the number of previous time windows having features that spatially overlap that can be used based on the required response time and data stream frequency is determined. For example, with reference, to FIG. 1, the processor 146 can make this determination. (JIAZUO: is this correct? In the IDF you referred to this as "the value" of the number of retrieving windows—point 3 in the description of FIG. 1 in the IDF. Is this value based on the required response time and data stream frequency? If so, can you provide details on this value and the required response time/data stream frequency?).

At block 808, features for the real time data in the current time window are determined. For example, with reference, to FIG. 1, the processor 146 can perform this determination.

In particular, the streaming data can include features A-D but the interested features can be a subset of these features (e.g., features A-C). For example, the features for the current time window may include different properties of the subsurface formation, such as density, porosity, permeability, resistivity. However, the interested features may be density and resistivity. The stream data can be processed to locate the interested features. The interested features can be those features to be used to make interpretations or predictions of the subsurface formation using the selected machine learning model.

At block 810, features in the real time data in the current time window (including feature type, feature number, and spatial location range) are stored. For example, with reference, to FIG. 1, the processor 146 can store these features in the storage 136.

At block 812, a determination is made of whether the number of previous time windows is less than a threshold. For example, with reference, to FIG. 1, the processor 146 can make this determination. This threshold can vary across current time windows, across different wellbores, etc. For example, this threshold can be based on the required response time, processing rate, how deep the spatial location is, etc. In some implementations, the threshold value can be directly proportional to the required response time and processing rate, while being inversely proportional to the depth of the spatial location. For example, the threshold value is less when the required response time and/or processing rate are less and as the value of the depth of the spatial location increases. If the number of previous time windows is less than the threshold, operations of the flowchart 800 continue at block 814. If the number of previous time windows is not less than a threshold, operations of the flowchart 800 continue at block 818 (which is further described below).

At block 814, a determination is made of whether each of the previous time windows is within a predefined spatial range of the spatial location for the feature data of the current time window. For example, with reference, to FIG. 1, the processor 146 can make this determination. For example, the predefined spatial range can be some range above and below the spatial location for the feature data of the current time window. The range can be in terms of actual distance (e.g., +/−50 feet), a percentage (e.g., +/−10%) of the spatial location, etc. If each of the previous time windows is within the predefined spatial range, operations of the flowchart 800 continue at block 816. If each of the previous time windows is not within the predefined spatial range, operations of the flowchart 800 continue at block 818.

At block 816, data from each of the previous time windows is loaded. For example, with reference, to FIG. 1, the processor 146 can retrieve this data for each of the previous time windows from the storage 136. Operations of the flowchart 800 continue at transition point A, which continue at transition point A of the flowchart 900 of FIG. 9 (which is further described below).

At block 818, data from only selected number of previous time windows determined based on the required response time and data stream frequency (see block 806 described above regarding the determination of this selected number). For example, with reference, to FIG. 1, the processor 146 can retrieve this data for each of these selected previous time windows from the storage 136. Operations of the flowchart 800 continue at transition point A, which continue at transition point A of the flowchart 900 of FIG. 9.

Operations continue at transition point A of the flowchart 900. From transition point A of the flowchart 900, operations continue at block 902.

At block 902, feature data for the selected previous time windows having features that have spatial overlaps with features in the current time window is loaded. For example, with reference, to FIG. 1, the processor 146 can retrieve this feature data from the storage 136.

At block 904, feature data from the selected number of previous time windows is merged with current feature data from the current time window. For example, with reference, to FIG. 1, the processor 146 can merge the data. An example of merging of this data between the current feature data and the feature data from the selected number of previous time windows is depicted in FIG. 6 (described above).

At block 906, features from the merged data are selected to be used for machine learning prediction. For example, with reference, to FIG. 1, the processor 146 can select the features. As described above, this can be all or some subset of the features in the current time window.

At block 908, interpolation of the selected features at the same spatial location (depth) is performed. For example, with reference, to FIG. 1, the processor 146 can perform an interpolation of the selected features. An example of interpolation is depicted in FIG. 7 (described above).

At block 910, a determination of whether an input sample frequency or required response time has changed. For example, with reference, to FIG. 1, the processor 146 can make this determination. If an input sample frequency or required response time has changed, operations of the flowchart 900 continues at block 912. Otherwise, operations of the flowchart 900 continue at block 914.

At block 912, data points in the current time window are resampled. For example, with reference, to FIG. 1, the processor 146 can resample the data points. The processor 146 can replace the data points in the current time window in the interpolated merged features with the resampled data points.

Figure 11:
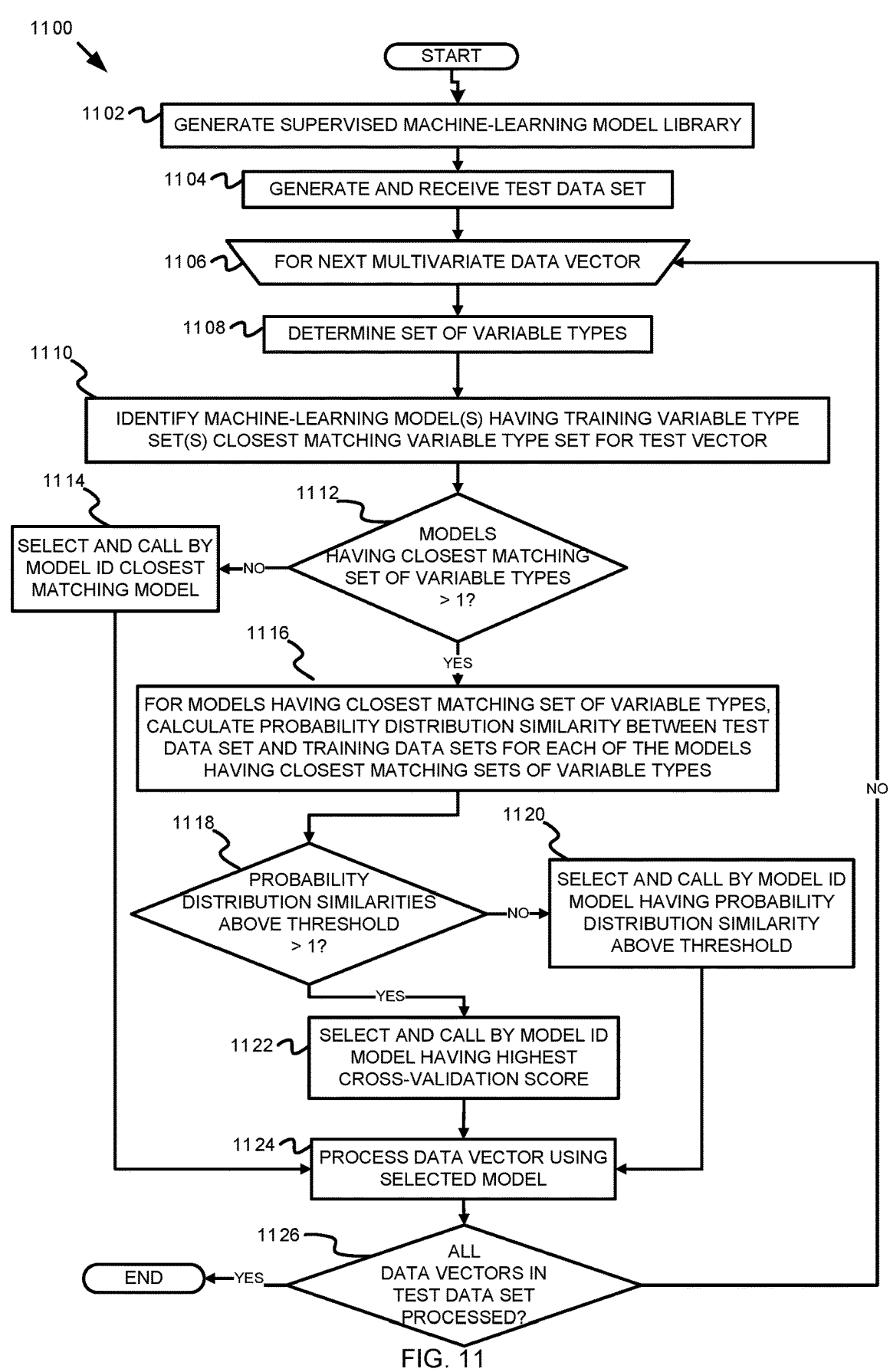
FIG. 11 depicts a flowchart of example operations to provide a machine learning model recommendation based on feature merging for a spatial location across multiple time windows, according to some embodiments.

At block 914, a machine learning model is selected for data in the current time window based on the number of features, calculated prior probabilities that measure between the training data and the real time streaming data, and the accuracy of the pre-trained machine learning models. For example, with reference, to FIG. 1, the processor 146 can make this selection. Example operations for selecting a machine learning model for data in the current time window based on the number of features, calculated prior probabilities that measure between the training data and the real time streaming data, and the accuracy of the pre-trained machine learning models is depicted in FIG. 11 (which is further described below).

At block 916, predictive formation evaluation is performed based on the selected machine learning model and the selected features. For example, with reference, to FIG. 1, the processor 146 can perform predictive formation evaluation based on the selected machine learning model and the selected features for data in the current time window. Operations of the flowcharts 800-900 are complete.

FIG. 10 depicts a flowchart of example operations to generate machine-learning models, according to some embodiments. FIG. 10 depicts a flowchart 1000 that includes operations can be performed by software, firmware, hardware or a combination thereof. Such operations are described with reference to the systems 100-300 of FIGS. 1-3. For example, the operations of the flowchart 1000 can be used to generate machine learning models for storage in the model database 220 of the system 200 (FIG. 2) or the model database 324 of the system 300 (FIG. 3). However, such operations can be performed by other systems or components. For example, some of all of the operations can be performed by a processor downhole in the wellbore. The operations of the flowchart 1000 start at block 1002.

At block 1002, a training set generator can generate training sets or records using multiple different combinations of training variables. At block 1004, the training sets are also generated using different data value content for the variables such that collections of the training sets will have different probability distributions.

Model training begins at block 1006 with a classification trainer training models using training sets having differing combinations of training variables and different combinations of training data sets. As a result, a set of suitably variable models are generated that may be selectively called to classify individual test data points that may vary within a data set. For each individual model, the classification trainer or a processing unit that maintains the MLM library records data associated with the training data set used to train the model (block 1008). For example, the classification trainer may record the set of training variables and the probability distribution for the training data set such as in metadata included in the model. At block 1010, the classification trainer performs a cross-validation test for each model. For example, a subset of the training data set may be withheld from the pattern matching configuration training of a model and that data input to determine the accuracy of the model. The process ends as shown at block 1012 with the classification trainer recording, such as within model metadata, the cross-validation values/scores for each of the models.

FIG. 11 depicts a flowchart of example operations to provide a machine learning model recommendation based on feature merging for a spatial location across multiple time windows, according to some embodiments. FIG. 11 depicts a flowchart 1100 that includes operations can be performed by software, firmware, hardware or a combination thereof. Such operations are described with reference to the systems 100-300 of FIGS. 1-3. For example with reference to FIG. 3, the operations of the flowchart 1100 can be used to recommend a best machine learning model from the model database 324 based on the interpolated merged features (from both a current time window and previous time windows for a given spatial location). However, such operations can be performed by other systems or components. For example, some of all of the operations can be performed by a processor downhole in the wellbore. The operations of the flowchart 1100 start at block 1102.

The operations and functions depicted and described with reference to FIG. 4 may be implemented by one or more of the systems, devices, and components depicted in FIGS. 1-3. The process begins as shown at block 1102 with a model generator, such as model generator 202 in FIG. 2, generating a library of machine learning models, as described with reference to FIG. 10. Real time streaming data set is generated such as via the system 100 in FIG. 1 and received by systems such as shown in FIGS. 1 and 2 to produce a data set comprising multiple multivariate data vectors (block 1104).

Classification processing of the data set is performed by classifying at least some of the multivariate data vectors individually in a sequence beginning with block 1106 with classification of a next test data vector in the set. The test data vector classification sequence begins at block 1108 with a classifier and/or model select unit determining the set of variable types within the test data vector. At block 1110, the classifier/model select unit compares the variable type set for the test data vector with the training variable type sets for the MLM models in the library to identify one or more closest matches. In response to determining a single closest match at inquiry block 1112, control passes to block 1114 with the classifier/model select unit selecting and calling the closest matching model by model ID.

In response to determining more than one closest match at inquiry block 1112, control passes to block 1116 with the classifier/model select unit using probability distribution similarity as a model selection criterion. For example, the model select unit may determine a probability distribution for the dataset for the current time window that includes the test vector. The model select unit compares the data probability distribution with the probability distributions of each of the models determined at block 1110 to have a variable type set closest matching to the variable type set of the test vector. For example, each comparison may be implemented by calculating a similarity value, such as a fraction or percent, between the current dataset probability distribution and the probability distributions of the training datasets for the machine learning models.

In some embodiments, determining a similarity between a probability distribution for the current dataset and the probability distributions for the multiple machine learning models comprises calculating distance between data points in the probability distribution for the current dataset and data points in the probability distributions for the machine-leaning models. Furthermore, determining a similarity between a probability distribution for the current dataset and the probability distributions for the multiple machine learning models may include comparing probability distributions for the same variable types.

In response to determining that only one calculated similarity value exceeds a threshold value (block 1118), control passes to block 1120 with the model select unit selecting and calling the model having a probability distribution similarity above the threshold. In response to determining that more than one calculated similarity value exceeds the threshold (block 1118), control passes to block 1122 with the model select unit selecting and calling the model, among the models corresponding to the exceeding similarity values, a model having a highest cross-validation score. Following selection of a model to classify the test data vector at one of blocks 1114, 1120, or 1122, a classifier processes the selected model to determine a formation property classification (block 1124). If additional test vectors within the current dataset remain to be classified as determined at inquiry block 1126, control returns to block 1106 to begin processing the next test vector until all of the test vectors are classified and the process ends.

The flow diagrams and flowcharts are annotated with a series of numbers. These number represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Drilling and Wireline Systems

Figure 12:
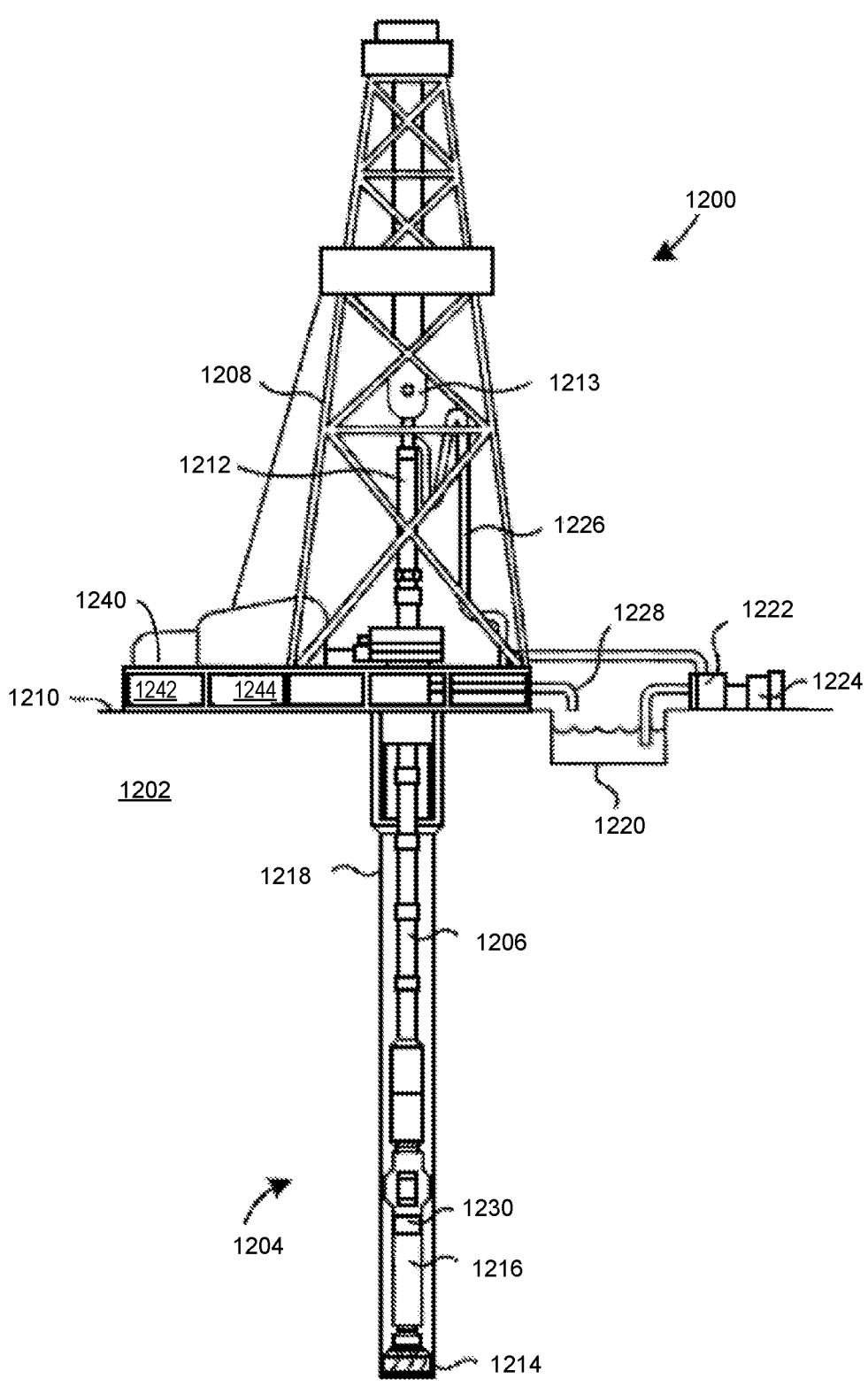
FIG. 12 illustrates an example drilling system, according to some embodiments.

FIG. 12 illustrates an example drilling system, according to some embodiments. A drilling system 1200 is configured to include downhole measurement tools and sensors for measuring properties of downhole material such as formation material and downhole fluids. The measurements may be processed as test data for example to determine, using the machine-learning model generation and selection procedure described above, the lithological class and chemical composition of the downhole materials. The resultant downhole material properties information may be utilized for various purposes such as for modifying a drilling parameter or configuration, such as penetration rate or drilling direction, in a measurement-while-drilling (MWD) and a logging-while-drilling (LWD) operation. The drilling system 1200 may be configured to drive a bottom hole assembly (BHA) 1204 positioned or otherwise arranged at the bottom of a drill string 1206 extended into the earth 1202 from a derrick 1208 arranged at the surface 1210. The derrick 1208 may include a kelly 1212 and a traveling block 1213 used to lower and raise the kelly 1212 and the drill string 1206.

The BHA 1204 may include a drill bit 1214 operatively coupled to a tool string 1216 that may be moved axially within a drilled wellbore 1218 as attached to the drill string 1206. During operation, the drill bit 1214 penetrates the earth 1202 and thereby creates the wellbore 1218. The BHA 1204 may provide directional control of the drill bit 1214 as it advances into the earth 1202. The tool string 1216 can be semi-permanently mounted with various measurement tools (not shown) such as, but not limited to, MWD and LWD tools, that may be configured to perform downhole measurements of downhole conditions. In some embodiments, the measurement tools may be self-contained within the tool string 1216, as shown in FIG. 12.

Drilling fluid from a drilling fluid tank 1220 may be pumped downhole using a pump 1222 powered by an adjacent power source, such as a prime mover or motor 1224. The drilling fluid may be pumped from the tank 1220, through a stand pipe 1226, which feeds the drilling fluid into the drill string 1206 and conveys the same to the drill bit 1214. The drilling fluid exits one or more nozzles arranged in the drill bit 1214 and in the process cools the drill bit 1214. After exiting the drill bit 1214, the drilling fluid circulates back to the surface 1210 via the annulus defined between the wellbore 1218 and the drill string 1206, and in the process, returns drill cuttings and debris to the surface. The cuttings and mud mixture are passed through a flow line 1228 and are processed such that a cleaned drilling fluid is returned down hole through the stand pipe 1226.

The tool string 1216 may further include a downhole tool 1230 similar to the downhole tools described herein. The downhole tool 1230 may be controlled from the surface 1210 by a computer 1240 having a memory 1242 and a processor 1244. Accordingly, the memory 1242 may store commands that, when executed by the processor 1244, cause the computer 1240 to perform at least some steps in methods consistent with the present disclosure.

Figure 13:
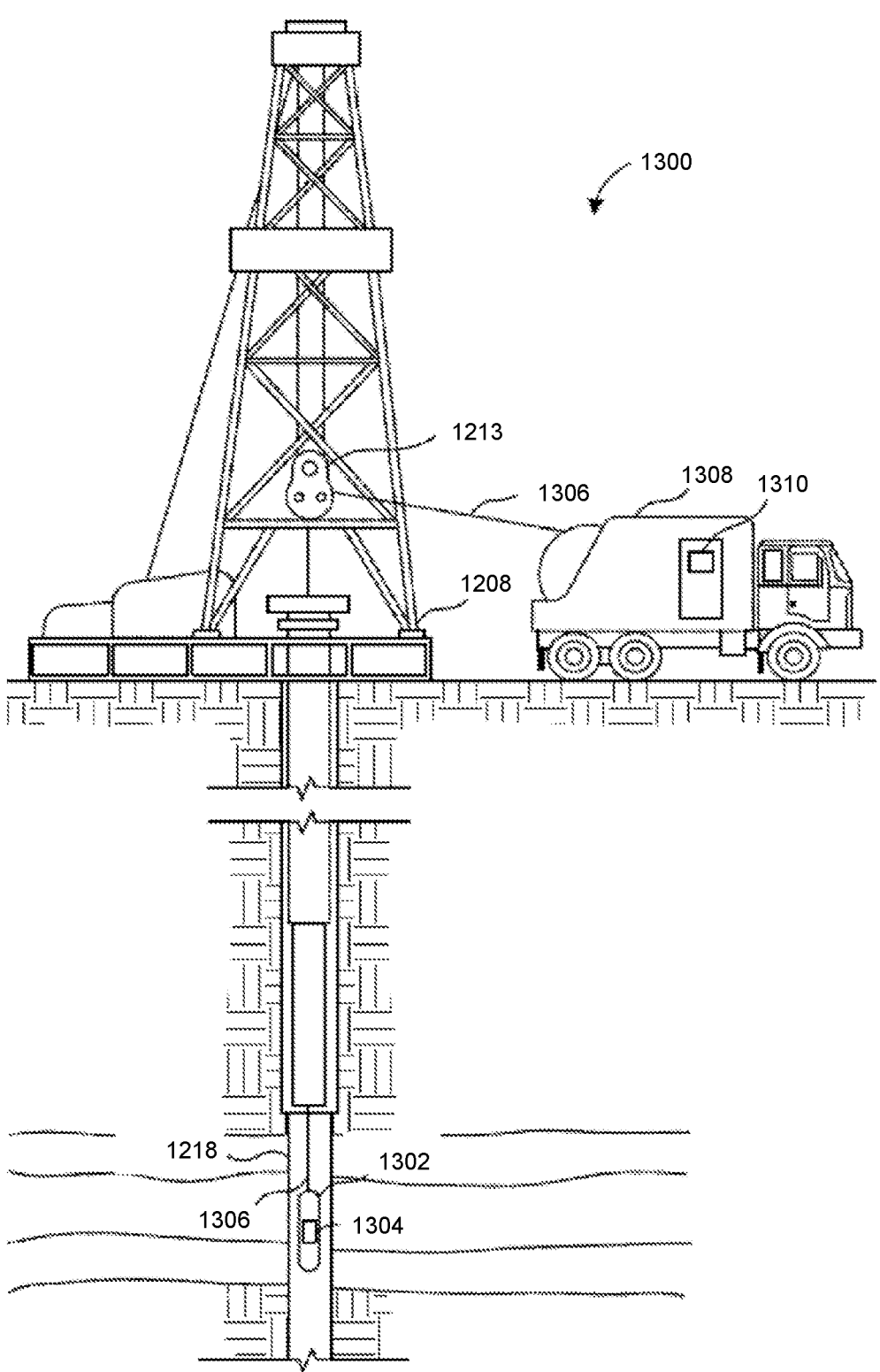
FIG. 13 depicts a wireline system, according to some embodiments.

FIG. 13 depicts a wireline system, according to some embodiments. FIG. 13 depicts a wireline system 1300 may be configured to deploy and operate downhole measurement tools. After drilling of the wellbore 1218 is complete, it may be desirable to determine details regarding formation material and composition of formation fluids and associated properties through wireline sampling. The wireline system 1300 may include a downhole tool 1302 that forms part of a wireline logging operation that can include one or more measurement components 1304, as described herein, as part of a downhole measurement tool. The wireline system 1300 may include the derrick 1208 that supports the traveling block 1213. The downhole tool 1302, such as a probe or sonde, may be lowered by a wireline cable 1306 into the wellbore 1218.

The downhole tool 1302 may be lowered to potential production zone or other region of interest within the wellbore 1218 and used in conjunction with other components such as packers and pumps to perform downhole measurements and other well testing and sampling. Measurement components 1304 may be configured to measure conditions and responses of the formation materials and fluids, and any measurement data generated by the downhole tool 1302 and its associated measurement components 1304 can be real-time processed for decision-making, or communicated to a surface logging facility 1308 for storage, processing, and/or analysis. A logging facility 1308 may be provided with electronic equipment 1310, including processors for various types of data and signal processing including perform at least some steps in methods consistent with the present disclosure.

Example Computer

Figure 14:
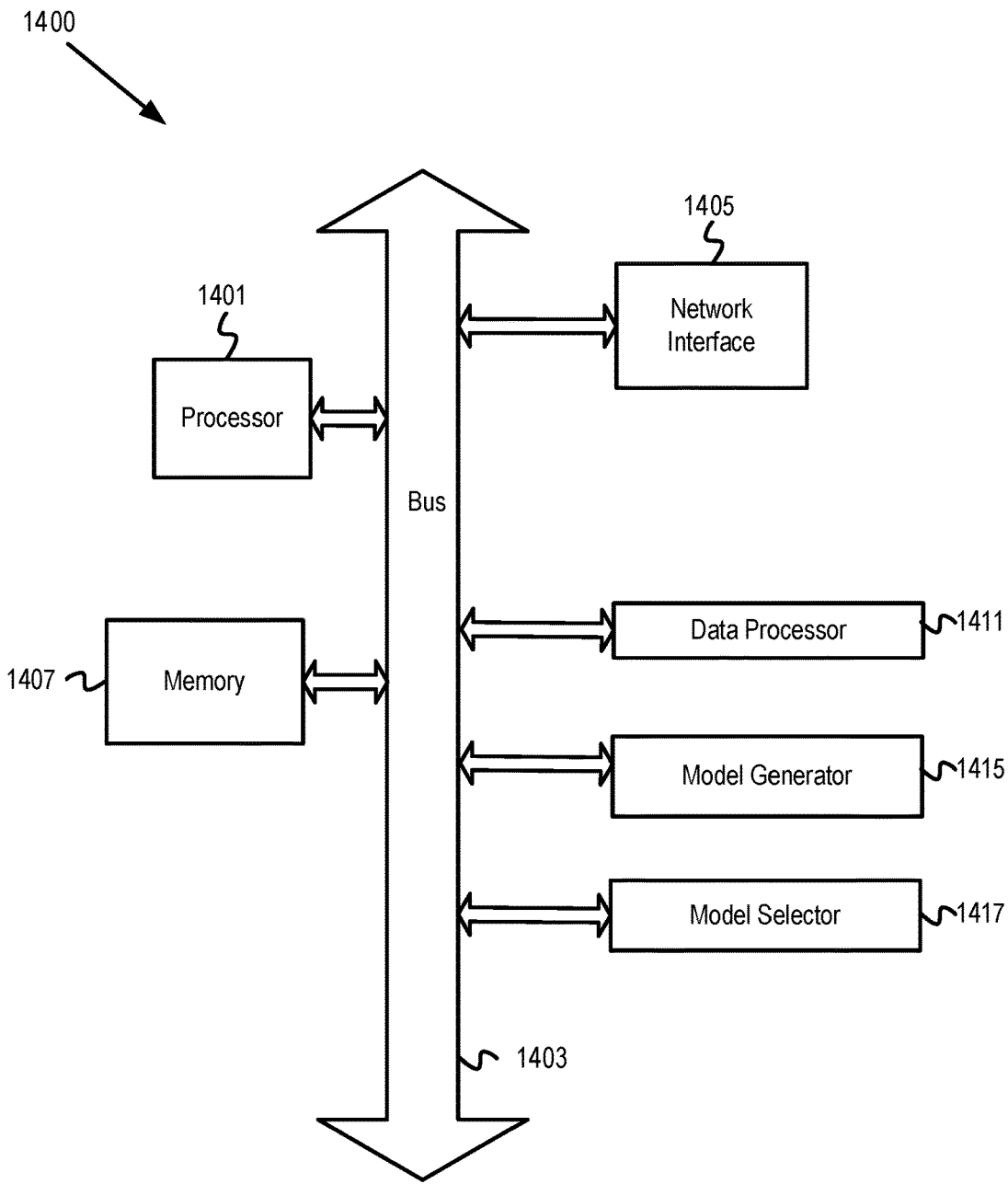
FIG. 14 depicts an example computer, according to some embodiments.

FIG. 14 depicts an example computer, according to some embodiments. A computer 1400 includes a processor 1401 (possibly including multiple processors, multiple cores, multiple nodes, and/or implementing multi-threading, etc.). The computer 1400 also includes a memory 1407. The memory 1407 may be system memory or any one or more of the above already described possible realizations of machine-readable media. The computer 1400 also includes a bus 1403 and a network interface 1405. The computer 1400 can communicate via transmissions to and/or from remote devices via the network interface 1405 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1400 also includes a data processor 1411, a model generator 1415, and a model selector 1417. The data processor 1411, the model generator 1415, and the model selector 1417 can perform the previously described functionalities and may be partially (or entirely) implemented in hardware and/or on the processor 1401. For example, the functionality may be implemented with an application specific integrated circuit, in logic implemented in the processor 1401, in a co-processor on a peripheral device or card, etc. Further, realizations may include fewer or additional components not illustrated in FIG. 14 (e.g., video cards, audio cards, additional network interfaces, peripheral devices, etc.). The processor 1401 and the network interface 1405 are coupled to the bus 1403. Although illustrated as being coupled to the bus 1403, the memory 1407 may be coupled to the processor 1401.

While the aspects of the disclosure are described with reference to various implementations and exploitations, it will be understood that these aspects are illustrative and that the scope of the claims is not limited to them. In general, techniques for machine learning model selection or recommendation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: A method comprising: receiving a current dataset for a current time window from at least one sensor in a wellbore created in a subsurface formation, wherein the current dataset comprises values of a number of current features of the subsurface formation at a spatial location in the wellbore; selecting at least one previous time window from a number of previous time windows that includes a previously cached dataset that was detected by the at least one sensor or a different sensor in the wellbore and that spatially overlaps with the spatial location for the current dataset; merging the current dataset with the previously cached dataset from the at least one selected previous time window to create a merged dataset; and selecting a machine learning model from a plurality of machine learning models for the spatial location in the wellbore based on the merged dataset.

Embodiment 2: The method of Embodiment 1, wherein selecting the at least one previous time window comprises: determining which of the previous time windows from among the number of previous time windows are eligible to be used for merging with the current dataset based on a required response time and a data stream frequency of the current dataset being received; and defining an eligible previous time window group to include the previous time windows that are eligible.

Embodiment 3: The method of Embodiment 2, wherein selecting the at least one previous time window comprises: determining a total window value that includes the number of previous time windows; and in response to determining that the total window value is not less than a total window threshold, selecting the previous time windows in the eligible previous time window group for merging with the current dataset.

Embodiment 4: The method of Embodiment 3, wherein selecting the at least one previous time window comprises: determining whether each of the number of previous time windows is within a spatial range of the spatial location; and in response to determining that each of the number of previous time windows is not within a spatial range of the spatial location, selecting the previous time windows in the eligible previous time window group for merging with the current dataset.

Embodiment 5: The method of Embodiment 4, wherein selecting the at least one previous time window comprises: in response to determining that the total window value is less than the total window threshold and in response to determining that each of the number of previous time windows is within the spatial range of the spatial location, selecting each of the previous time windows in the number of previous time windows for merging with the current dataset.

Embodiment 6: The method of any one of Embodiments 1-5, wherein selecting the machine learning model from the plurality of machine learning models for the spatial location in the wellbore based on the merged dataset comprises selecting the machine learning model from the plurality of machine learning models for the spatial location in the wellbore based on a similarity between a probability distribution for the merged dataset and probability distributions for the plurality of machine learning models.

Embodiment 7: The method of Embodiment 6, wherein selecting the machine learning model from the plurality of machine learning models for the spatial location in the wellbore based on the similarity between the probability distribution for the merged dataset and the probability distributions for the plurality of machine learning models comprises: determining the similarity between the probability distribution for the merged dataset and the probability distributions for the plurality of machine learning models to generate similarity values for each of the plurality of machine learning models; and in response to one of the similarity values exceeding a threshold value, selecting a machine learning model having the similarity value that exceeds the threshold value.

Embodiment 8: The method of Embodiment 7, wherein selecting the machine learning model from the plurality of machine learning models for the spatial location in the wellbore based on the similarity between the probability distribution for the merged dataset and the probability distributions for the plurality of machine learning models comprises: in response to two or more machine learning models of the plurality of machine learning models having a similarity value exceeding the threshold value, selecting a machine learning model having a highest cross-validation value among the two or more machine learning models.

Embodiment 9: The method of Embodiment 8, wherein selecting the machine learning model having the highest cross-validation value comprises comparing cross-validation values that each represent classification accuracy based on testing using a subset of training data for training the plurality of machine learning models.

Embodiment 10: The method of any one of Embodiments 1-9, further comprising: interpolating the merged dataset to add interpolated data points between data points of the merged dataset, wherein selecting the machine learning model comprises selecting the machine learning model for the spatial location based on the interpolated data points.

Embodiment 11: The method of any one of Embodiments 1-10, further comprising: inputting the current dataset into the selected machine learning model; and performing a predictive formation evaluation of the subsurface formation at the spatial location in the wellbore based on an output from the selected machine learning model that is a result of inputting the current dataset into the selected machine learning model.

Embodiment 12: A system comprising: at least one sensor to be positioned in a wellbore created in a subsurface formation; a processor; and a machine-readable medium having program code executable by the processor to cause the processor to: receive a current dataset for a current time window from the at least one sensor, wherein the current dataset comprises values of a number of current features of the subsurface formation at a spatial location in the wellbore; select at least one previous time window from a number of previous time windows that includes a previously cached dataset that was detected by the at least one sensor or a different sensor in the wellbore and that spatially overlaps with the spatial location for the current dataset; merge the current dataset with the previously cached dataset from the at least one selected previous time window to create a merged dataset; and select a machine learning model from a plurality machine learning models for the spatial location in the wellbore based on the merged dataset.

Embodiment 13: The system of Embodiment 12, wherein the program code executable by the processor to cause the processor to select the at least one previous time window comprises program code executable by the processor to cause the processor to: determine which of the previous time windows from among the number of previous time windows are eligible to be used for merging with the current dataset based on a required response time and a data stream frequency of the current dataset being received; and define an eligible previous time window group to include the previous time windows that are eligible.

Embodiment 14: The system of Embodiment 13, wherein the program code executable by the processor to cause the processor to select the at least one previous time window comprises program code executable by the processor to cause the processor to: determine a total window value that includes the number of previous time windows; and in response to determining that the total window value is not less than a total window threshold, select the previous time windows in the eligible previous time window group for merging with the current dataset.

Embodiment 15: The system of Embodiment 14, wherein the program code executable by the processor to cause the processor to select the at least one previous time window comprises program code executable by the processor to cause the processor to: determine whether each of the number of previous time windows is within a spatial range of the spatial location; and in response to determining that each of the number of previous time windows is not within a spatial range of the spatial location, selecting the previous time windows in the eligible previous time window group for merging with the current dataset.

Embodiment 16: The system of Embodiment 15, wherein the program code executable by the processor to cause the processor to select the at least one previous time window comprises program code executable by the processor to cause the processor to: in response to determining that the total window value is less than the total window threshold and in response to determining that each of the number of previous time windows is within the spatial range of the spatial location, select each of the previous time windows in the number of previous time windows for merging with the current dataset.

Embodiment 17: The system of any one of Embodiments 12-16, wherein the program code comprises program code executable by the processor to cause the processor to input the current dataset into the selected machine learning model; and perform a predictive formation evaluation of the subsurface formation at the spatial location in the wellbore based on an output from the selected machine learning model that is a result of inputting the current dataset into the selected machine learning model.

Embodiment 18: One or more non-transitory machine-readable media comprising program code executable by a processor to cause a processor to: receive a current dataset for a current time window from at least one sensor in a wellbore created in a subsurface formation, wherein the current dataset comprises values of a number of current features of the subsurface formation at a spatial location in the wellbore; select at least one previous time window from a number of previous time windows that includes a previously cached dataset that was detected by the at least one sensor or a different sensor in the wellbore and that spatially overlaps with the spatial location for the current dataset; merge the current dataset with the previously cached dataset from the at least one selected previous time window to create a merged dataset; and select a machine learning model from a plurality machine learning models for the spatial location in the wellbore based on the merged dataset.

Embodiment 19: The one or more non-transitory machine-readable media of Embodiment 18, wherein the program code executable by the processor to cause the processor to select the at least one previous time window comprises program code executable by the processor to cause the processor to: determine which of the previous time windows from among the number of previous time windows are eligible to be used for merging with the current dataset based on a required response time and a data stream frequency of the current dataset being received; define an eligible previous time window group to include the previous time windows that are eligible; determine a total window value that includes the number of previous time windows; in response to determining that the total window value is not less than a total window threshold, select the previous time windows in the eligible previous time window group for merging with the current dataset; determine whether each of the number of previous time windows is within a spatial range of the spatial location; in response to determining that each of the number of previous time windows is not within a spatial range of the spatial location, select the previous time windows in the eligible previous time window group for merging with the current dataset; in response to determining that the total window value is less than the total window threshold and in response to determining that each of the number of previous time windows is within the spatial range of the spatial location, select each of the previous time windows in the number of previous time windows for merging with the current dataset.

Embodiment 20: The one or more non-transitory machine-readable media of any one of Embodiments 18-19, wherein the program code comprises program code executable by a processor to cause a processor to: input the current dataset into the selected machine learning model; and perform a predictive formation evaluation of the subsurface formation at the spatial location in the wellbore based on an output from the selected machine learning model that is a result of inputting the current dataset into the selected machine learning model.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    receiving, in a real time stream, a current dataset for a current time window from at least one sensor in a wellbore created in a subsurface formation, wherein the current dataset comprises values of a number of current features of the subsurface formation at a spatial location in the wellbore;

selecting at least one previous time window from a number of previous time windows that includes a previously cached dataset that was detected by the at least one sensor or a different sensor in the wellbore and that spatially overlaps with the spatial location for the current dataset;
    merging the current dataset with the previously cached dataset across the current time window and the at least one selected previous time window to create a merged dataset; and
    predictively evaluating the subsurface formation in real time during hydrocarbon recovery operations using a machine learning model selected from a plurality of machine learning models for the spatial location in the wellbore based on a comparison between a probability distribution of a training dataset and a probability distribution for the merged dataset.

2. The method of claim 1, wherein selecting the at least one previous time window comprises:
    determining which of the previous time windows from among the number of previous time windows are eligible to be used for merging with the current dataset based on a required response time and a data stream frequency of the current dataset being received; and
    defining an eligible previous time window group to include the previous time windows that are eligible.

3. The method of claim 2, wherein selecting the at least one previous time window comprises:
    determining a total window value that includes the number of previous time windows; and
    in response to determining that the total window value is not less than a total window threshold, selecting the previous time windows in the eligible previous time window group for merging with the current dataset.

4. The method of claim 3, wherein selecting the at least one previous time window comprises:
    determining whether each of the number of previous time windows is within a spatial range of the spatial location; and
    in response to determining that each of the number of previous time windows is not within a spatial range of the spatial location, selecting the previous time windows in the eligible previous time window group for merging with the current dataset.

5. The method of claim 4, wherein selecting the at least one previous time window comprises:
    in response to determining that the total window value is less than the total window threshold and in response to determining that each of the number of previous time windows is within the spatial range of the spatial location, selecting each of the previous time windows in the number of previous time windows for merging with the current dataset.

6. The method of claim 1, wherein selecting the machine learning model from the plurality of machine learning models for the spatial location in the wellbore based on the merged dataset comprises selecting the machine learning model from the plurality of machine learning models for the spatial location in the wellbore based on a similarity between the probability distribution for the merged dataset and probability distributions for training data for the plurality of machine learning models.

7. The method of claim 6, wherein selecting the machine learning model from the plurality of machine learning models for the spatial location in the wellbore based on the similarity between the probability distribution for the merged dataset and the probability distributions for the training data for the plurality of machine learning models comprises:

determining the similarity between the probability distribution for the merged dataset and the probability distributions for the training data for the plurality of machine learning models to generate similarity values for each of the plurality of machine learning models; and in response to one of the similarity values exceeding a threshold value, selecting a machine learning model having the similarity value that exceeds the threshold value.

8. The method of claim 7, wherein selecting the machine learning model from the plurality of machine learning models for the spatial location in the wellbore based on the similarity between the probability distribution for the merged dataset and the probability distributions for the training data for the plurality of machine learning models comprises:

in response to two or more machine learning models of the plurality of machine learning models having a similarity value exceeding the threshold value, selecting a machine learning model having a highest cross-validation value among the two or more machine learning models.

9. The method of claim 8, wherein selecting the machine learning model having the highest cross-validation value comprises comparing cross-validation values that each represent classification accuracy based on testing using a subset of training data for training the plurality of machine learning models.

10. The method of claim 1, further comprising:

interpolating the merged dataset to add interpolated data points between data points of the merged dataset, wherein selecting the machine learning model comprises selecting the machine learning model for the spatial location based on the interpolated data points.

11. The method of claim 1, further comprising:

inputting the current dataset into the selected machine learning model; and performing the predictive formation evaluation of the subsurface formation at the spatial location in the wellbore based on an output from the selected machine learning model that is a result of inputting the current dataset into the selected machine learning model.

12. A system comprising:

at least one sensor to be positioned in a wellbore created in a subsurface formation;

a processor; and a machine-readable medium having program code executable by the processor to cause the processor to:

receive, in a real time stream, a current dataset for a current time window from the at least one sensor, wherein the current dataset comprises values of a number of current features of the subsurface formation at a spatial location in the wellbore;

select at least one previous time window from a number of previous time windows that includes a previously cached dataset that was detected by the at least one sensor or a different sensor in the wellbore and that spatially overlaps with the spatial location for the current dataset;

merge the current dataset with the previously cached dataset across the current time window and the at least one selected previous time window to create a merged dataset; and predictively evaluate the subsurface formation in real time during hydrocarbon recovery operations using a machine learning model selected from a plurality of machine learning models for the spatial location in the wellbore based on a comparison between a probability distribution of a training dataset and a probability distribution for the merged dataset.

13. The system of claim 12, wherein the program code executable by the processor to cause the processor to select the at least one previous time window comprises program code executable by the processor to cause the processor to:

determine which of the previous time windows from among the number of previous time windows are eligible to be used for merging with the current dataset based on a required response time and a data stream frequency of the current dataset being received; and define an eligible previous time window group to include the previous time windows that are eligible.

14. The system of claim 13, wherein the program code executable by the processor to cause the processor to select the at least one previous time window comprises program code executable by the processor to cause the processor to:

determine a total window value that includes the number of previous time windows; and in response to determining that the total window value is not less than a total window threshold, select the previous time windows in the eligible previous time window group for merging with the current dataset.

15. The system of claim 14, wherein the program code executable by the processor to cause the processor to select the at least one previous time window comprises program code executable by the processor to cause the processor to:

determine whether each of the number of previous time windows is within a spatial range of the spatial location; and in response to determining that each of the number of previous time windows is not within a spatial range of the spatial location, selecting the previous time windows in the eligible previous time window group for merging with the current dataset.

16. The system of claim 15, wherein the program code executable by the processor to cause the processor to select the at least one previous time window comprises program code executable by the processor to cause the processor to:

in response to determining that the total window value is less than the total window threshold and in response to determining that each of the number of previous time windows is within the spatial range of the spatial location, select each of the previous time windows in the number of previous time windows for merging with the current dataset.

17. The system of claim 12, wherein the program code comprises program code executable by the processor to cause the processor to input the current dataset into the selected machine learning model; and perform the predictive formation evaluation of the subsurface formation at the spatial location in the wellbore based on an output from the selected machine learning model that is a result of inputting the current dataset into the selected machine learning model.

18. One or more non-transitory machine-readable media comprising program code executable by a processor to cause a processor to:

receive, in a real time stream, a current dataset for a current time window from at least one sensor in a wellbore created in a subsurface formation, wherein the current dataset comprises values of a number of current features of the subsurface formation at a spatial location in the wellbore;

select at least one previous time window from a number of previous time windows that includes a previously cached dataset that was detected by the at least one sensor or a different sensor in the wellbore and that spatially overlaps with the spatial location for the current dataset;

merge the current dataset with the previously cached dataset across the current time window and the at least one selected previous time window to create a merged dataset that comprises at least a portion of the previously cached dataset and at least a portion of the current dataset; and predictively evaluate the subsurface formation in real time during hydrocarbon recovery operations using a machine learning model selected from a plurality of machine learning models for the spatial location in the wellbore based on a comparison between a probability distribution of a training dataset and a probability distribution for the merged dataset.

19. The one or more non-transitory machine-readable media of claim 18, wherein the program code executable by the processor to cause the processor to select the at least one previous time window comprises program code executable by the processor to cause the processor to:

determine which of the previous time windows from among the number of previous time windows are eligible to be used for merging with the current dataset based on a required response time and a data stream frequency of the current dataset being received;

define an eligible previous time window group to include the previous time windows that are eligible;

determine a total window value that includes the number of previous time windows;

in response to determining that the total window value is not less than a total window threshold, select the previous time windows in the eligible previous time window group for merging with the current dataset;

determine whether each of the number of previous time windows is within a spatial range of the spatial location;

in response to determining that each of the number of previous time windows is not within a spatial range of the spatial location, select the previous time windows in the eligible previous time window group for merging with the current dataset; and in response to determining that the total window value is less than the total window threshold and in response to determining that each of the number of previous time windows is within the spatial range of the spatial location, select each of the previous time windows in the number of previous time windows for merging with the current dataset.

20. The one or more non-transitory machine-readable media of claim 18, wherein the program code comprises program code executable by a processor to cause a processor to:

input the current dataset into the selected machine learning model; and perform the predictive formation evaluation of the subsurface formation at the spatial location in the wellbore based on an output from the selected machine learning model that is a result of inputting the current dataset into the selected machine learning model.

* * * * *